United States Patent
Horiguchi

(10) Patent No.: US 12,522,213 B2
(45) Date of Patent: Jan. 13, 2026

(54) VEHICLE TRAVELING CONTROL APPARATUS

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 77 days.

(21) Appl. No.: 18/591,641

(22) Filed: Feb. 29, 2024

(65) Prior Publication Data

US 2025/0074420 A1    Mar. 6, 2025

(30) Foreign Application Priority Data

Mar. 8, 2023    (JP) ................................ 2023-035707

(51) Int. Cl.
*B60W 30/18*    (2012.01)
*B60W 10/20*    (2006.01)

(52) U.S. Cl.
CPC ...... *B60W 30/18045* (2013.01); *B60W 10/20* (2013.01); *B60W 2520/04* (2013.01); (Continued)

(58) Field of Classification Search
CPC ........... B60W 30/18045; B60W 10/20; B60W 2520/04; B60W 2555/20; B60W 2710/20; (Continued)

(56) References Cited

U.S. PATENT DOCUMENTS

2015/0105974 A1*  4/2015  Kleve ............... B60W 10/18
                                                  701/36
2018/0099661 A1*  4/2018  Bae .................. B60W 30/06
(Continued)

FOREIGN PATENT DOCUMENTS

JP    H09228312 A    9/1997
JP    2012-021297 A    2/2012
(Continued)

OTHER PUBLICATIONS

KR_20250090157_A_I_translation (Year: 2025).*

*Primary Examiner* — Kyle T Johnson
(74) *Attorney, Agent, or Firm* — Rimon P.C.

(57) ABSTRACT

A vehicle traveling control apparatus includes a surrounding environment recognition device, a vehicle state recognition device, and a traveling control unit. The surrounding environment recognition device acquires surrounding environment data regarding a vehicle. The vehicle state recognition device acquires state data regarding the vehicle. The traveling control unit executes a traveling control of the vehicle, based on the surrounding environment data and the state data. When the traveling control unit recognizes, based on the surrounding environment data, that the vehicle is parked or stopped in a parking lot and that a road surface in a surrounding region of a parking or stopping position of the vehicle is in a snow accumulation situation, the traveling control unit executes a region generation traveling control that is the traveling control of generating a boarding or alighting region for an occupant of the vehicle in the surrounding region of the parking or stopping position.

6 Claims, 10 Drawing Sheets

(52) U.S. Cl.
CPC ..... *B60W 2555/20* (2020.02); *B60W 2710/20* (2013.01); *B60W 2720/24* (2013.01)

(58) Field of Classification Search
CPC ............. B60W 2720/24; B60W 40/06; B60W 60/0016; B60W 50/0098; B60W 60/00184
See application file for complete search history.

(56) References Cited

U.S. PATENT DOCUMENTS

| | | | | |
|---|---|---|---|---|
| 2019/0146516 | A1* | 5/2019 | Eshima | G08G 1/143 |
| | | | | 701/23 |
| 2019/0180621 | A1* | 6/2019 | Matsuda | B60R 21/00 |
| 2020/0166946 | A1* | 5/2020 | Langer | B60S 1/62 |
| 2020/0307603 | A1* | 10/2020 | Kobayashi | B60W 40/06 |
| 2022/0415060 | A1* | 12/2022 | Harada | G06V 20/588 |
| 2024/0092388 | A1* | 3/2024 | Jenkins | B60W 40/06 |
| 2025/0074420 | A1* | 3/2025 | Horiguchi | B60W 40/06 |

FOREIGN PATENT DOCUMENTS

| | | | | |
|---|---|---|---|---|
| JP | 2014-037686 A | | 2/2014 | |
| KR | 20250090157 A | * | 5/2025 | ............. G06Q 50/43 |

\* cited by examiner

VEHICLE TRAVELING CONTROL APPARATUS

CROSS-REFERENCE TO RELATED APPLICATIONS

The present application claims priority from Japanese Patent Application No. 2023-035707 filed on Mar. 8, 2023, the entire contents of which are hereby incorporated by reference.

BACKGROUND

The disclosure relates to a vehicle traveling control apparatus.

Recently, a development has been made on an automated driving control techniques for automatedly driving a vehicle such as an automobile without involving a driver's driving operation. Further, various traveling control apparatuses that achieve various traveling controls to assist driver's driving operations using the automated driving control technique have been proposed and put to practical use.

For example, in a place such as a parking lot under a snow accumulation situation, snow accumulated on an internal passage or multiple parking spaces can be compacted by a passing vehicle or a passing person passing, or melted snow can be frozen, which can bring about a slippery state.

In the parking lot under such a road surface situation, for example, when an occupant boards or alights from a parked or stopped vehicle, the slippery road surface can cause the occupant to fall down. Thus, a road surface situation where it is difficult to board or alight from a vehicle can often occur in a place such as a parking lot under a snow accumulation situation. Hence, on an internal passage or within a parking space in a parking lot, it is desired that snow be removed from at least a surrounding region of a parked or stopped vehicle or that, for example, accumulated snow in the surrounding region be stamped down.

However, it can be difficult to frequently perform snow removal work in the parking lot, depending on a snowfall situation or a situation of a parking lot facility. Accordingly, a driver of a vehicle who uses a parking lot under a snow accumulation situation, for example, generally removes snow around the own vehicle as necessary, when an occupant boards or alights in the parking lot. Such work takes time and effort, and can hinder passage of another vehicle or a passing person passing through the parking lot in some cases.

Various apparatuses have been proposed that achieve smooth traffic, by improving a slippery snowy road or a frozen road surface into a non-slippery road surface. For example, reference is made to Japanese Unexamined Patent Application Publication (JP-A) Nos. H09-228312, 2012-021297, and 2014-037686.

On the other hand, various traveling control systems called, for example, an assisted parking system (APS) and a partially automated parking system (PAPS) have recently been proposed, as parking control systems to be used to park a vehicle.

Among such traveling control systems for vehicles, for example, the parking control system recognizes a parking zone setting member or a gap space between the own vehicle and an adjacent other vehicle, detects a vacant parking space, and performs various controls, including steering, driving, and braking, of the vehicle as appropriate, under monitoring by a driver. The parking control system thus performs parking assistance in a parking operation (an automated parking and retrieving operation), or an automated parking process. The parking zone setting member includes a parking space indicated by a division line such as a white line on a road surface, or a three-dimensional structure such as a parking block. Note that such a parking control system is configured to perform a control (of type 1) performed with the driver staying inside the vehicle, and a control (of type 2) performed under monitoring by the driver from outside the vehicle.

SUMMARY

An aspect of the disclosure provides a vehicle traveling control apparatus to be applied to a vehicle. The vehicle traveling control apparatus includes a surrounding environment recognition device, a vehicle state recognition device, and a traveling control unit. The surrounding environment recognition device is configured to acquire surrounding environment data regarding the vehicle. The vehicle state recognition device is configured to acquire state data regarding the vehicle. The traveling control unit is configured to execute a traveling control of the vehicle, based on the surrounding environment data acquired by the surrounding environment recognition device and the state data acquired by the vehicle state recognition device. The traveling control unit is configured to, when the traveling control unit recognizes, based on the surrounding environment data, that the vehicle is parked or stopped in a parking lot and that a road surface in a surrounding region of a parking or stopping position of the vehicle is in a snow accumulation situation, execute a region generation traveling control that is the traveling control of generating a boarding or alighting region for an occupant of the vehicle in the surrounding region of the parking or stopping position.

An aspect of the disclosure provides a vehicle traveling control apparatus to be applied to a vehicle. The vehicle traveling control apparatus includes circuitry. The circuitry is configured to acquire surrounding environment data regarding the vehicle. The circuitry is configured to acquire state data regarding the vehicle. The circuitry is configured to execute a traveling control of the vehicle, based on the surrounding environment data and the state data. The circuitry is configured to, when it is recognized, based on the surrounding environment data, that the vehicle is parked or stopped in a parking lot and that a road surface in a surrounding region of a parking or stopping position of the vehicle is in a snow accumulation situation, execute a region generation traveling control that is the traveling control of generating a boarding or alighting region for an occupant of the vehicle in the surrounding region of the parking or stopping position.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
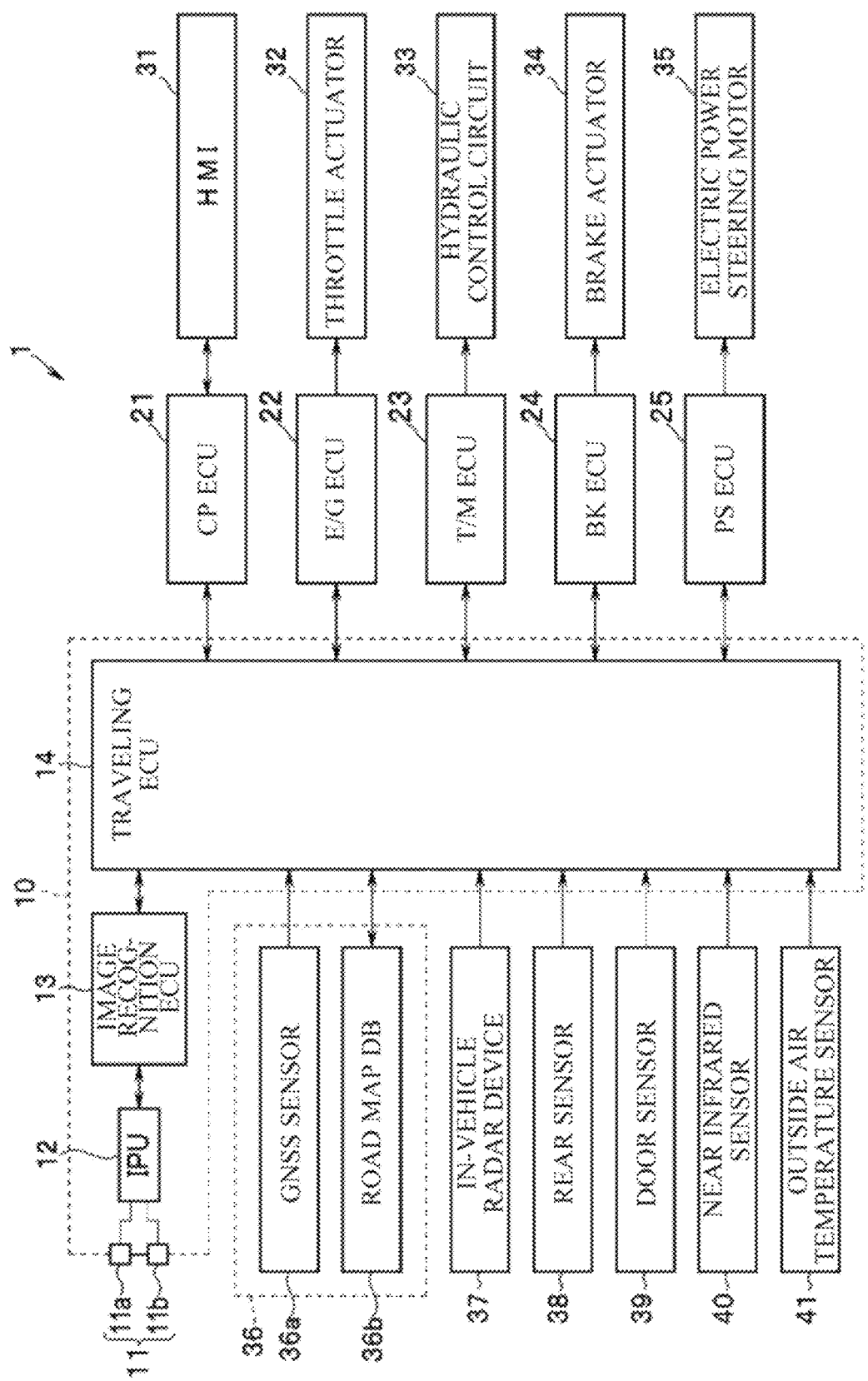
FIG. 1 is a block configuration diagram illustrating a schematic configuration of a vehicle traveling control apparatus according to one example embodiment of the disclosure.

Apparatuses disclosed in JP-A Nos. H09-228312, 2012-021297, and 2014-037686 are mainly intended to improve vehicle roads to allow a vehicle to travel smoothly. Therefore, large-scale apparatuses dedicated for road surface improvement are to be provided. In addition, the apparatuses disclosed in JP-A Nos. H09-228312, 2012-021297, and 2014-037686 gives no consideration to, for example, a situation when an occupant boards or alights from a parked or stopped vehicle in a parking lot.

It is desirable to provide a vehicle traveling control apparatus that makes it possible for an occupant to easily board and alight from a parked or stopped vehicle, for example, in a place such as a parking lot under a snow accumulation situation.

In the following, some example embodiments of the disclosure are described in detail with reference to the accompanying drawings. Note that the following description is directed to illustrative examples of the disclosure and not to be construed as limiting to the disclosure. Each of the drawings used in the following description are schematic, and the dimension relationship, the scale, and the like are different between components to illustrate each of the components in a size recognizable in each of the drawings. Factors including, without limitation, numbers, shapes, ratios of dimensions, and relative positions of components illustrated in each of the drawings are illustrative only and not to be construed as limiting to the disclosure. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. In addition, elements that are not directly related to any embodiment of the disclosure are unillustrated in the drawings.

First, a description is given below of a schematic configuration of a vehicle traveling control apparatus according to an example embodiment of the disclosure, with reference to FIG. 1. FIG. 1 is a block configuration diagram illustrating the schematic configuration of the vehicle traveling control apparatus according to the example embodiment of the disclosure. The vehicle traveling control apparatus according to the example embodiment may have a basic configuration substantially similar to that of an existing traveling control apparatus of a similar type. Thus, the following is an outline description of the vehicle traveling control apparatus according to the example embodiment.

A vehicle traveling control apparatus 1 according to the example embodiment may include a camera unit 10. The camera unit 10 may be an in-vehicle camera device fixed to the middle of a front upper part in a vehicle compartment of a vehicle mounted with the vehicle traveling control apparatus 1. The vehicle mounted with the vehicle traveling control apparatus 1 may hereinafter be referred to as an own vehicle or an own vehicle M.

The camera unit 10 may include a stereo camera 11, an image processing unit (IPU) 12, an image recognition unit (image recognition ECU) 13, and a traveling control unit (traveling ECU) 14.

The stereo camera 11 may include a main camera 11a and a sub-camera 11b. The main camera 11a and the sub-camera 11b may be, for example, disposed to face a front direction (a traveling direction), at symmetrical positions with respect to a midpoint in a vehicle-width direction in the vehicle compartment of the own vehicle. The main camera 11a and the sub-camera 11b may each include, for example, a complementary metal-oxide-semiconductor (CMOS) image sensor. The main camera 11a and the sub-camera 11b may acquire two images from different viewpoints of a surrounding environment of a front predetermined range outside the vehicle, in predetermined imaging cycles synchronized with each other, to generate a stereo image.

The IPU 12 may perform predetermined image processing on surrounding environment image data captured by the stereo camera 11. The surrounding environment image data may be image data indicating the surrounding environment in which the own vehicle is traveling. The IPU 12 may thus detect edges of various targets including, for example, an object represented in the image, a division line marked on a road surface, or a border marked on a road surface inside a place such as a parking lot. The division line and the border may hereinafter be collectively referred to as a line such as a division line. Thus, the IPU 12 may recognize a three-dimensional object or a line such as a division line around the vehicle. The IPU 12 may acquire distance data based on an amount of shift in position between corresponding edges on left and right images, and generate image data including the distance data (distance image data).

Based on the distance image data, for example, received from the IPU 12, the image recognition ECU 13 may determine a road curvature [1/m] of each of division lines, or lane lines, that define left and right of an own-vehicle traveling course along which the own vehicle travels, and a width (i.e., a lane width) between the left and right division lines. The road curvature and the lane width may be determined by any of various known methods. For example, the image recognition ECU 13 may determine the road curvature by recognizing the left and right division lines based on the distance image data, and determining the curvature of each of the left and right division lines for each predetermined section. The right and left division lines may be recognized through a binarization process that utilizes a difference in luminance. The curvature of each of the right and left division lines may be determined through, for example, a curve-approximating expression that is based on a least-square method. Furthermore, the image recognition ECU 13 may calculate the lane width from a difference between the respective curvatures of the left and right division lines.

The image recognition ECU 13 may calculate, for example, the middle of the lane and an own vehicle lateral position deviation, based on the curvature of each of the left and right division lines and the lane width. The own vehicle lateral position deviation may be a distance from the middle of the lane to the middle of the own vehicle in the vehicle-width direction. The image recognition ECU 13 may similarly calculate, for example, the own vehicle lateral position deviation with respect to a border indicating a parking space.

The image recognition ECU 13 may also perform predetermined pattern matching, for example, on the distance image data, to recognize a three-dimensional object. and, for example, a situation of a road surface (hereinafter referred to as a situation such as a road surface situation). Examples of the three-dimensional object may include a guard rail and a curbstone that extend along the road, and a surrounding vehicle. In recognizing the three-dimensional object, the image recognition ECU 13 may recognize, for example, a type of the three-dimensional object, a height of the three-dimensional object, a distance to the three-dimensional object, a speed of the three-dimensional object, a relative speed between the three-dimensional object and the own vehicle, and a relative distance between three-dimensional objects. The relative distance between three-dimensional objects may be, for example, a lateral distance between a curbstone at a road edge and a division line near the curbstone. The situation such as the road surface situation may be, for example, a situation where a road surface is wet with rain or snowmelt water, a rainfall situation, a snow accumulation situation, a snow compaction situation, or a road surface freezing situation.

These various pieces of data recognized by the image recognition ECU 13 may be outputted to the traveling ECU 14 as first surrounding environment data.

In one embodiment, the image recognition ECU 13 may thus serve, together with the stereo camera 11 and the IPU 12, as a "surrounding environment recognition device". The image recognition ECU 13 may, together with the stereo camera 11 and the IPU 12, recognize a first surrounding environment around the vehicle.

The traveling ECU 14 may be a control unit that centrally controls the vehicle traveling control apparatus 1. The traveling ECU 14 may be coupled, via an in-vehicle communication line such as a controller area network (CAN), to various control units including a cockpit control unit (CP ECU) 21, an engine control unit (E/G ECU) 22, a transmission control unit (T/M ECU) 23, a brake control unit (BK ECU) 24, and a power steering control unit (PS ECU) 25.

The CP ECU 21 may be coupled to a human-machine interface (HMI) 31 provided around a driver's seat. The HMI 31 may include, for example, a switch, a mode switching switch, a steering-wheel touch sensor, a driver monitoring system (DMS), a vehicle inside monitoring system, a touch panel display (a visual indicator), a combination meter, and a sound output device (an auditory indicator). The switch may be used for instruction for execution of various driving assistance controls. The mode switching switch may be used for switching between driving modes. The steering-wheel touch sensor may detect a steering-wheel holding state of a driver who drives the vehicle. The DMS may, for example, recognize the driver's face or detect the driver's line of sight. The vehicle inside monitoring system may include, for example, a vehicle inside camera, and may recognize a boarding situation of an occupant including the driver. The sound output device may include, for example, a speaker.

Upon receiving a control signal from the traveling ECU 14, the CP ECU 21 may notify the driver as appropriate of various pieces of information regarding, for example, various alerts for a preceding vehicle, a state of execution of the driving assistance control, and the surrounding environment of the own vehicle. Such notification may be given by, for example, display or sound outputted via the HMI 31. In addition, the CP ECU 21 may output, to the traveling ECU 14, various pieces of input information including an on/off operation state for the various driving assistance controls inputted by the driver via the HMI 31.

The E/G ECU 22 may have an output terminal coupled to, for example, a throttle actuator 32 of an electronic control throttle device. The E/G ECU 22 may have an input terminal coupled to various sensors, including an unillustrated accelerator sensor.

The E/G ECU 22 may be a driving device that drives and controls the throttle actuator 32 to generate a driving force for the vehicle, based on, for example, a control signal from the traveling ECU 14 or a detection signal from the various sensors. The E/G ECU 22 may thus regulate an intake air amount of an engine to generate a desired engine output. In addition, the E/G ECU 22 may output, to the traveling ECU 14, a signal indicating a factor such as an accelerator position detected by any of the various sensors.

The T/M ECU 23 may have an output terminal coupled to a hydraulic control circuit 33. The T/M ECU 23 may have an input terminal coupled to various sensors, including an unillustrated shift position sensor. The T/M ECU 23 may perform a hydraulic control for the hydraulic control circuit 33 based on, for example, an engine torque signal estimated by the E/G ECU 22 or a detection signal from the various sensors. The T/M ECU 23 may thus operate a part such as a friction engagement member or a pulley provided in an automatic transmission, to perform shifting of the engine output at a desired shifting ratio. In addition, the T/M ECU 23 may output, to the traveling ECU 14, a signal indicating a factor such as a shift position detected by any of the various sensors.

The BK ECU 24 may have an output terminal coupled to a brake actuator 34. The brake actuator 34 may regulate a brake fluid pressure to be applied to a brake wheel cylinder provided on each wheel. The BK ECU 24 may have an input terminal coupled to various sensors, including a brake pedal sensor, a yaw rate sensor, a longitudinal acceleration sensor, and a vehicle speed sensor, which are unillustrated.

The BK ECU 24 may be a braking device that drives and controls the brake actuator 34 to perform a braking control on the vehicle, based on a control signal from the traveling ECU 14 or a detection signal from the various sensors. The BK ECU 24 may thus generate, as appropriate on each wheel, a braking force to be used to perform a forcible braking control or a yaw rate control, for example, for the own vehicle. In addition, the BK ECU 24 may output, to the traveling ECU 14, signals indicating factors including a brake operation state, a yaw rate, a longitudinal acceleration rate, and a vehicle speed (i.e., an own vehicle speed) detected by the various sensors.

The PS ECU 25 may have an output terminal coupled to an electric power steering motor 35. The electric power steering motor 35 may impart a steering torque to a steering mechanism using a rotary power of the motor. The PS ECU 25 may have an input terminal coupled to various sensors, including a steering torque sensor and a steering angle sensor, which are unillustrated.

The PS ECU 25 may be a steering device that drives and controls the electric power steering motor 35 to perform a steering control on the vehicle, based on a control signal from the traveling ECU 14 or a detection signal from the various sensors. The PS ECU 25 may thus generate the steering torque for the steering mechanism. In addition, the PS ECU 25 may output, to the traveling ECU 14, signals indicating factors including the steering torque and a steering angle detected by the various sensors.

Furthermore, the traveling ECU 14 may be coupled to various sensors including, for example, a locator unit 36, an in-vehicle radar device 37, a rear sensor 38, a door sensor 39, a near infrared sensor 40, and an outside air temperature sensor 41.

The locator unit 36 may include a global navigation satellite system (GNSS) sensor 36a and a high-precision road map database (road map DB) 36b.

The GNSS sensor 36a may receive positioning signals from multiple positioning satellites to measure a position (e.g., a latitude, a longitude, and an altitude) of the own vehicle.

The road map DB 36b may be a large-capacity storage medium such as a hard disk drive (HDD) or a solid state drive (SSD). The road map DB 36b may hold high-precision road map data, e.g., a dynamic map. The road map DB 36b may hold, for example, lane data to be involved in the execution of automated driving. Examples of the lane data may include lane width data, lane middle position coordinate data, lane forward azimuth angle data, and speed limit data. The lane data may be held at intervals of several meters, in each lane on the road map.

In addition, the locator unit 36 may acquire real-time data regarding the surrounding environment at the own vehicle position measured by the GNSS sensor 36a, by communicating with an unillustrated external system. The real-time data regarding the surrounding environment may be, for example, road congestion data, weather data, and various pieces of data regarding a place such as a parking lot. In this case, the weather data may also include, for example, rainfall data, snowfall data, snow accumulation data, and temperature and humidity data regarding a region including the own vehicle position.

The road map DB 36b may hold, for example, data regarding various facilities and a place such as a parking lot. The road map DB 36b may output, to the traveling ECU 14 as third surrounding environment data, the road map data of a range set with reference to the own vehicle position measured by the GNSS sensor 36a, for example, based on a request signal from the traveling ECU 14. In one embodiment, the road map DB 36b may thus serve, together with the GNSS sensor 36a, as the "surrounding environment recognition device". The road map DB 36b may, together with the GNSS sensor 36a, recognize a third surrounding environment around the vehicle.

The in-vehicle radar device 37 may include multiple sensors, for example, multiple millimeter-wave radars. The millimeter-wave radars may output radio waves, and receive and analyze reflected waves from an object. The millimeter-wave radars may thus mainly detect a three-dimensional object such as a pedestrian or a vehicle traveling side by side, and an object such as a structure provided at a road edge (e.g., an edge of a road on a road shoulder side). Examples of the structure may include a three-dimensional object such as a curbstone, a guard rail, a wall of a building, or a planting. The millimeter-wave radars may also detect, for example, a three-dimensional obstacle present on a road. In this case, the millimeter-wave radars may detect, as example of data regarding the three-dimensional object, a width of the three-dimensional object, a position (e.g., a relative position and a relative distance to the own vehicle) of a representative point of the three-dimensional object, and a relative speed of the three-dimensional object.

The sensors (e.g., the millimeter-wave radars) included in the in-vehicle radar device 37 may be provided on, for example, left and right side parts of a front bumper, as front left and right side sensors, and on left and right side parts of a rear bumper, as rear left and right side sensors. The front left and right side sensors may detect, as second surrounding environment data, three-dimensional objects present in left and right obliquely frontward and sideward regions of the own vehicle, which are difficult to recognize from the image obtained by the stereo camera 11. The rear left and right side sensors may detect, as the second surrounding environment data, three-dimensional objects present in left and right obliquely sideward and rearward regions of the own vehicle, which are difficult to recognize by the front left and right side sensors.

In one embodiment, the in-vehicle radar device 37 may thus serve as the "surrounding environment recognition device". The in-vehicle radar device 37 may recognize a second surrounding environment around the vehicle. The data acquired by the sensors of the in-vehicle radar device 37 may be supplied to the image recognition ECU 13.

The rear sensor 38 may include, for example, a sonar device. At least one or more rear sensors 38 may be provided on, for example, the rear bumper. The rear sensor 38 may detect, as fourth surrounding environment data, three-dimensional objects present in a rearward region of the own vehicle, which are difficult to recognize by the rear left and right side sensors.

In one embodiment, the rear sensor 38 may thus serve as the "surrounding environment recognition device". The rear sensor 38 may recognize a fourth surrounding environment around the vehicle.

Coordinates of each target outside the vehicle, included in each of the first surrounding environment data recognized by the image recognition ECU 13, the third surrounding environment data recognized by the locator unit 36, the second surrounding environment data recognized by the in-vehicle radar device 37, and the fourth surrounding environment data recognized by the rear sensor 38 may be converted by the traveling ECU 14 into coordinates of a three-dimensional coordinate system having an origin at the center of the own vehicle.

The door sensor 39 may be a sensor that detects an open or closed state of a door for boarding or alighting of the own vehicle. In one embodiment, the door sensor 39 may thus serve as a "vehicle state recognition device". The door sensor 39 may acquire state data regarding the own vehicle.

The near infrared sensor 40 may be a sensor that recognizes a surrounding situation of the own vehicle, for example, a road surface situation such as a road surface temperature. Based on data acquired by the near infrared sensor 40, the road surface temperature, an amount of moisture on a road surface, and a snow accumulation situation on a road surface may be recognized, for example. The outside air temperature sensor 41 may be a sensor that detects a change in outside air temperature around the own vehicle.

Data acquired by the sensors including the near infrared sensor 40 and the outside air temperature sensor 41 may be detected as fifth surrounding environment data. In one embodiment, the sensors including the near infrared sensor 40 and the outside air temperature sensor 41 may thus serve as the "surrounding environment recognition device". The sensors including the near infrared sensor 40 and the outside air temperature sensor 41 may recognize a fifth surrounding environment around the vehicle.

The traveling ECU 14 executes a traveling control of the vehicle, based on pieces of data acquired by the various sensors. The traveling ECU 14 may execute desired traveling controls of the vehicle as appropriate by, for example, using the E/G ECU 22 to perform an engine output control or a torque distribution control for each drive wheel, use the T/M ECU 23 to control the transmission to thereby perform a forward or backward traveling direction control, and use the BK ECU 24 to perform an individual braking control for each wheel.

Some or all of units including the locator unit 36, the image recognition ECU 13, the traveling ECU 14, the CP ECU 21, the E/G ECU 22, the T/M ECU 23, the BK ECU 24, and the PS ECU 25 may be configured by a processor including hardware, for example.

The processor may be configured by: a known configuration including a central processing unit (CPU), a random access memory (RAM), a read only memory (ROM), a non-volatile memory, a non-volatile storage, and a non-transitory computer readable medium; and peripheral devices, for example.

The ROM, the non-volatile memory, and the non-volatile storage may store, in advance, fixed data such as software programs to be executed by the CPU or data tables. The CPU may read the software program stored in the ROM, for example, and develop and execute the program in the RAM. The software program may refer to various kinds of data as appropriate to thereby implement operations of the above-described constituting component and the constituting units (the image recognition ECU 13, the traveling ECU 14, the CP ECU 21, the E/G ECU 22, the T/M ECU 23, the BK ECU 24, the PS ECU 25, and the locator unit 36).

Alternatively, the processor may be configured by a semiconductor chip such as a field programmable gate array (FPGA). The above-described constituting component and the constituting units (the image recognition ECU 13, the traveling ECU 14, the CP ECU 21, the E/G ECU 22, the T/M ECU 23, the BK ECU 24, the PS ECU 25, and the locator unit 36) may be each configured by electronic circuitry, for example.

Part of or the entirety of the software program may be stored in a computer program product. Examples of the computer program product may include a portable disc medium such as a flexible disk, a CD-ROM, or a DVD-ROM, or a non-transitory computer readable medium such as a card memory, a hard disk drive (HDD), or a solid state drive (SSD).

Figure 2:
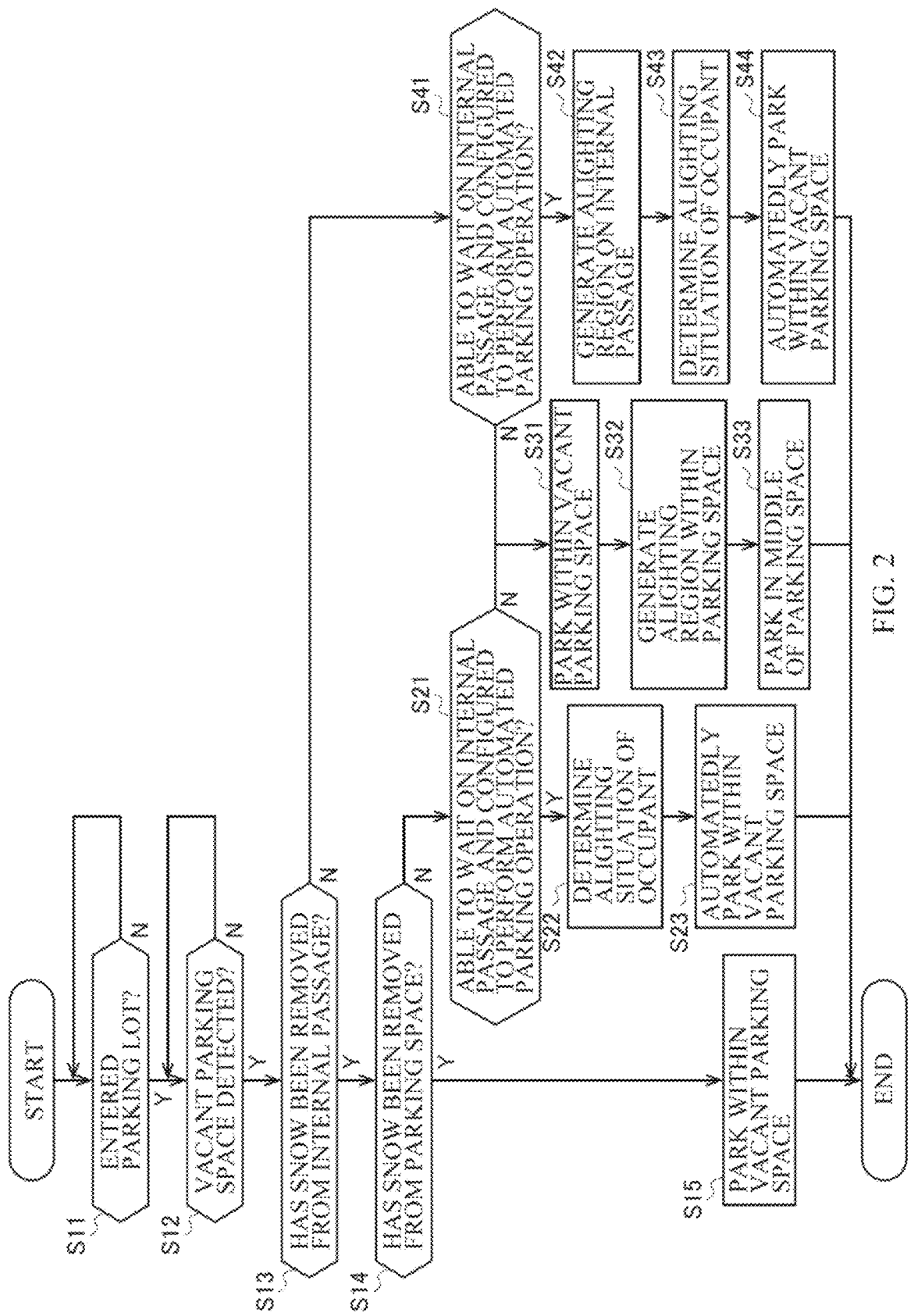
FIG. 2 is a flowchart illustrating, of operations of the vehicle traveling control apparatus according to one example embodiment of the disclosure, an operation performed when a vehicle is parked after entering a place such as a parking lot.

A description is given below of operations of the vehicle traveling control apparatus according to the example embodiment having the above-described configuration, with reference to FIGS. 2 to 17. FIGS. 2 and 11 are flowcharts each illustrating operations of the vehicle traveling control apparatus according to the example embodiment. FIG. 2 illustrates an operation performed when the own vehicle mounted with the vehicle traveling control apparatus according to the example embodiment is parked after entering a place such as a parking lot. FIG. 11 illustrates an operation performed when the own vehicle is retrieved, in a situation where the own vehicle mounted with the vehicle traveling control apparatus according to the example embodiment is parked in a place such as a parking lot.

The place such as the parking lot may be, for example, a parking lot attached to a store or an apartment house, or a parking lot called a paid parking lot, a metered parking, or a car park. Assumed is an outdoor parking lot having a predetermined area and in which multiple vehicles may be parked side by side. For example, mainly assumed is, like a parking lot for what is called a suburban large-scale shopping center, a parking lot including multiple parking spaces and an internal passage that allows for movement inside the parking lot.

FIGS. 3 to 10 are conceptual diagrams each illustrating a situation of one or more processing steps in the flowchart during parking of FIG. 2. FIGS. 12 to 17 are conceptual diagrams each illustrating a situation of one or more processing steps in the flowchart during retrieval of FIG. 11.

First, a description is given below of the operation performed when the own vehicle is parked in a place such as a parking lot, with reference to the flowchart of FIG. 2.

A processing sequence illustrated by the flowchart of FIG. 2 indicates a flow of an operation performed when, for example, the own vehicle M mounted with the vehicle traveling control apparatus 1 according to the example embodiment: enters a place such as a parking lot from, for example, a unillustrated road on which the vehicle has been traveling; thereafter travels through an internal passage of the parking lot; detects a vacant parking space from among multiple parking spaces; sets the detected vacant parking space as a parking target position; and parks the own vehicle M within the parking space of the set parking target position. Assumed as the surrounding environment of the own vehicle M at this time is, for example, under a snow accumulation situation.

Hence, it is assumed that the own vehicle M mounted with the vehicle traveling control apparatus 1 according to the example embodiment is traveling on, for example, an unillustrated road. At this time, the vehicle traveling control apparatus 1 of the own vehicle M may keep traveling while recognizing the surrounding situation and the state regarding the own vehicle M, based on, for example, the surrounding environment data acquired as appropriate by the surrounding environment recognition device (e.g., the stereo camera 11, the IPU 12, the image recognition ECU 13, the GNSS sensor 36a, the road map DB 36b, the in-vehicle radar device 37, the rear sensor 38, the near infrared sensor 40, and the outside air temperature sensor 41).

In this case, first, in step S11 of FIG. 2, the traveling ECU 14 may determine whether the own vehicle M has entered inside a predetermined parking lot, based on the surrounding environment data acquired by the surrounding environment recognition device. If it is determined that the own vehicle M has entered inside a parking lot ("Y" in step S11), the flow may proceed to step S12. If it is not determined that the own vehicle M has entered a parking lot ("N" in step S11), the traveling ECU 14 may repeat similar determination. In other words, the processing sequence illustrated in FIG. 2 may use a determination that the own vehicle M has entered inside a parking lot, as a substantial condition for start of execution of the processing sequence.

Thereafter, in step S12 of FIG. 2, the traveling ECU 14 may detect, based on the surrounding environment data acquired by the surrounding environment recognition device, a vacant parking space where the own vehicle M is to be parked from multiple parking spaces in the parking lot. Upon detection of a vacant parking space ("Y" in step S12), the traveling ECU 14 may temporarily stop the own vehicle M near the vacant parking space on the internal passage. Note that the detection of a vacant parking space may be repeated as loop processing until a vacant parking space is detected.

Although not illustrated, for example, if a vacant parking space is not detected for a predetermined time period or more, or if the process of detecting a vacant parking space is canceled by the driver, the processing sequence may be ended.

A vacant parking space may be detected mainly by, for example, recognizing a parking space marked by a division line such as a white line provided on a road surface inside the parking lot. In another example, a vacant parking space may be detected by recognizing a three-dimensional structure such as a parking block present within the parking space. In another example, a vacant parking space may be detected by recognizing a region adjacent to, for example, an already parked other vehicle. In another example, a vacant parking space may be detected by acquiring position data regarding a vacant parking space by receiving, for example, management data from a parking lot management server.

For example, when the surrounding environment is in a snowfall situation, a division line such as a white line on the road surface can be unrecognizable, depending on the image acquired by the stereo camera 11. Under such a situation, the vehicle traveling control apparatus 1 according to the example embodiment may be configured to reliably detect a vacant parking space, by acquiring surrounding environment data other than a camera image.

Note that the detection of a vacant parking space is not limited to the automatic detection described above. For example, the driver of the own vehicle may detect a vacant parking space by visual observation on his/her own, and set the vacant parking space as the parking target position.

Figure 3:
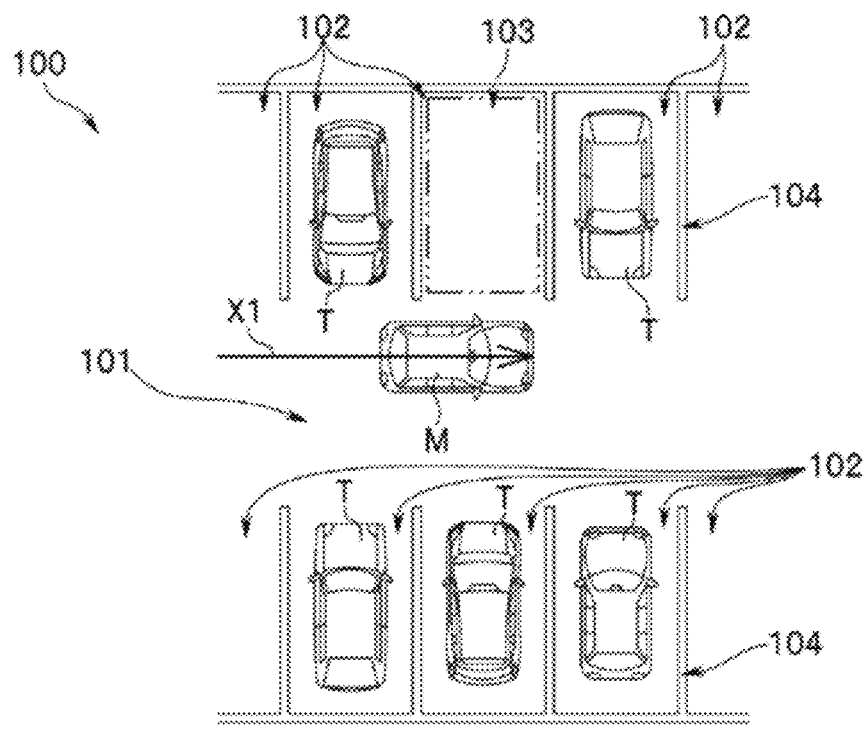
FIG. 3 is a conceptual diagram corresponding to a situation when processes of steps S12 to S14 in FIG. 2 are performed.

FIG. 3 is a conceptual diagram corresponding to a situation when processes of step S12 to S14 in FIG. 2 are performed. The situation illustrated in FIG. 3 indicates a state in which the own vehicle M is stopped on an internal passage 101 near a detected vacant parking space 103 ("Y" in step S12). At this time, it is recognized that the internal passage 101 and regions of multiple parking spaces 102 are in a situation where snow has been removed or a situation where no snow has accumulated ("Y" in step S13 and "Y" in step S14). The internal passage 101 and the regions of the parking spaces 102 may serve as a path through which the occupant passes to or from a parking position or a stopping position, i.e., a parking or stopping position, of the own vehicle M.

In FIG. 3, a reference sign 100 denotes the parking lot. The reference sign 101 denotes the internal passage of the parking lot 100. The reference sign 102 denotes the parking spaces. The reference sign 103 denotes the vacant parking space (indicated by a dashed and double-dotted line border). A reference sign 104 denotes the division line (e.g., a white line) indicating the parking space. The reference sign M denotes the own vehicle. A reference sign T denotes another vehicle. In this situation, multiple other vehicles T may be present. An arrow X1 indicates the traveling direction of the own vehicle M.

The situation illustrated in FIG. 3 indicates a situation where the own vehicle M has, after entering the parking lot 100, traveled in the direction of the arrow X1 on the internal passage 101. The situation illustrated in FIG. 3 indicates a situation where the own vehicle M has detected the vacant parking space 103, and has stopped at a predetermined position on the internal passage 101 near the vacant parking space 103. At this time, the situation illustrated in FIG. 3 indicates that the internal passage 101 and the regions of the parking spaces 102 are in a situation where snow has been removed or a situation where no snow has accumulated (see "Y" in step S13 and "Y" in step S14 to be described later).

In, for example, a parking lot in a snowy region such as a cold climate region, upon snow accumulation, snow removal work is generally performed on an internal passage and regions of multiple parking spaces, for example, by an administrator of the parking lot in some cases. In this case, for example, snow is removed from the entire region inside the parking lot including the internal passage and the parking spaces in some cases. For example, snow is removed from the internal passage but accumulated snow is left in the regions of the parking spaces in some other cases. Alternatively, even if snow removal work is performed on the entire region inside the parking lot, a vacant parking space available after snow removal can change to a snow accumulation situation, depending on snowfall situations at different times (e.g., if snowfall continues). Thus, the road surface inside the parking lot can be in various situations under a snow accumulation situation.

Hence, in step S13 of FIG. 2, the traveling ECU 14 may determine, based on the surrounding environment data acquired by the surrounding environment recognition device, whether the internal passage 101 of the parking lot 100 is in a situation where snow has been removed or a situation where no snow has accumulated. If it is determined that the internal passage 101 is in a situation where snow has been removed or a situation where no snow has accumulated ("Y" in step S13), the flow may proceed to step S14 (see FIG. 3). If it is determined that the internal passage 101 is in a situation where snow has not been removed or a situation where snow has accumulated ("N" in step S13), the flow may proceed to step S41 to be described later.

In step S14, the traveling ECU 14 may determine, based on the surrounding environment data acquired by the surrounding environment recognition device, whether the regions of the parking spaces 102 in the parking lot 100 are in a situation where snow has been removed or a situation where no snow has accumulated. If it is determined that the regions of the parking spaces 102 are in a situation where snow has been removed or a situation where no snow has accumulated ("Y" in step S14), the flow may proceed to step S15. If it is determined that the regions of the parking spaces 102 are in a situation where snow has not been removed or a situation where snow has accumulated ("N" in step S14), the flow may proceed to step S21.

In step S15, the traveling ECU 14 may perform an automated parking control for stopping of the own vehicle M within the vacant parking space 103.

Figure 4:
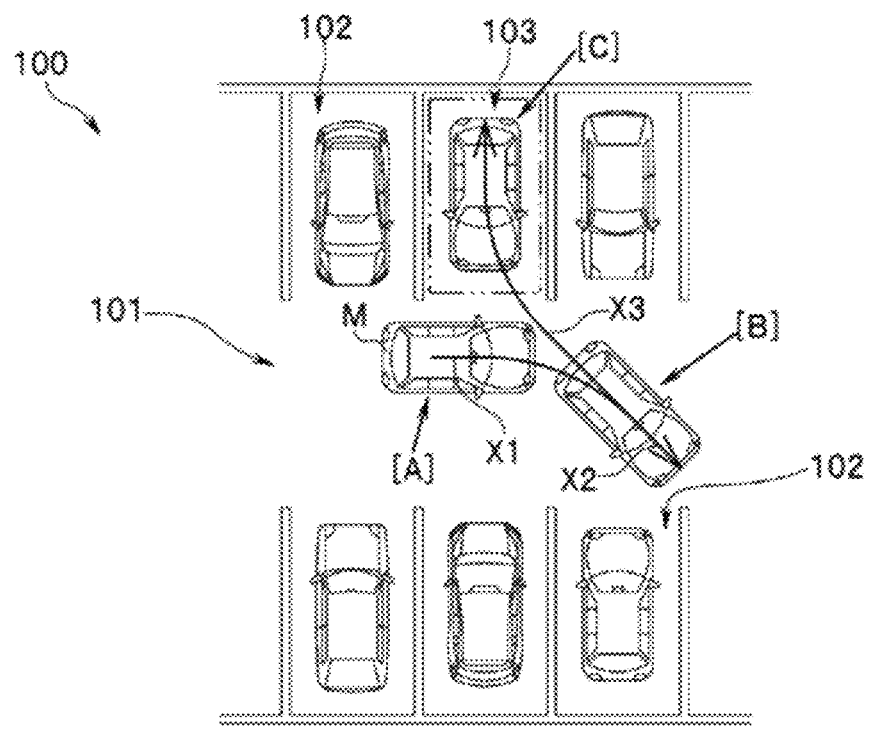
FIG. 4 is a conceptual diagram corresponding to a situation when a process of step S15 in FIG. 2 is performed.

FIG. 4 is a conceptual diagram corresponding to a situation when the process of step S15 in FIG. 2 is performed. The situation illustrated in FIG. 4 indicates a state in which the automated parking control is performed to park the own vehicle M within the vacant parking space 103, when the internal passage 101 and the regions of the parking spaces 102 are in a situation where snow has been removed or a situation where no snow has accumulated.

The automated parking control performed here is described in detail. The own vehicle M may be stopped at a position [A] illustrated in FIG. 4. At this time, the own vehicle M may first perform a predetermined steering control to travel in a direction of an arrow X2, while performing a forward traveling control in a direction of the arrow X1 in FIG. 4. Thus, the own vehicle M may move to a position [B]. At this time, when the own vehicle M moves to the position [B], the own vehicle M may perform a braking control to stop. Thereafter, the own vehicle M may perform a predetermined steering control, while performing a backward traveling control in a direction of an arrow X3 in FIG. 4. Thus, the own vehicle M may be guided to a position [C] at a substantially middle position of the vacant parking space 103. When the own vehicle M moves to the position [C], the own vehicle M may perform a braking control to stop.

Such an automated parking control or automated parking traveling control may be a control of automatedly executing various controls including a steering control, a driving control, and a braking control of the own vehicle M, or may be a parking assistance control. The automated parking traveling control performed here may be a control (of type 1) performed with the occupant such as the driver on board in the vehicle, i.e., staying in the vehicle.

In this case, instead of the traveling ECU 14 performing the automated parking traveling control or the parking assistance control, the driver may manually perform all of operations for parking within the vacant parking space.

In this manner, the parking control by the process of step S15 described above may be completed, and the processing sequence may be ended. The completion of the automated parking control may be determined, for example, based on a flag indicating completion of an automated parking control process, or detection of activation of a parking brake of the own vehicle M, or detection of an off signal of a main switch of the own vehicle M.

In contrast, in the process of step S14 described above, if it is determined that the regions of the parking spaces 102 are in a situation where snow has not been removed or a situation where snow has accumulated, the flow may proceed to step S21.

In step S21, the traveling ECU 14 may determine, based on the surrounding environment data acquired by the surrounding environment recognition device, whether the own vehicle M is in a situation of being able to wait for a predetermined time period in a stopped state on the internal passage 101. At the same time, the traveling ECU 14 may determine whether the own vehicle M is configured to perform an automated parking operation. Assumed as the situation where the own vehicle M is able to wait for the predetermined time period in the stopped state on the internal passage 101 may be, for example, a case where there is no other vehicle, for example, that approaches the own vehicle M on the internal passage 101 around the own vehicle M.

If it is determined that the own vehicle M is able to wait for the predetermined time period in the stopped state on the internal passage 101, and it is determined that the own vehicle M is configured to perform an automated parking operation ("Y" in step S21), the flow may proceed to step S22.

In step S22, the traveling ECU 14 may perform a process of determining an alighting situation of the occupant, while keeping the stopped state of the own vehicle M on the internal passage 101. The process of determining the alighting situation of the occupant performed here may be an operation described in outline below.

First, the own vehicle M may be temporarily stopped at a position near the vacant parking space 103 on the internal passage 101 (step S12 of FIG. 2). In this state, upon start of the process of step S22 described above, the traveling ECU 14 may issue an instruction to urge the occupant including the driver of the own vehicle M to alight. The instruction for alighting may be issued by using, for example, a predetermined display included in the HMI 31. In response to the instruction, the occupant including the driver may alight from the own vehicle M.

Thereafter, the traveling ECU 14 may determine the alighting situation of the occupant. The alighting situation of the occupant may be determined by, for example, detecting opening and closing of the door of the vehicle based on an output of the door sensor 39, or by using the vehicle inside monitoring system such as a vehicle inside camera included in the HMI 31. If it is determined that the occupant has alighted in this manner, the flow may proceed to step S23.

Thereafter, in step S23, the traveling ECU 14 may execute the automated parking control of parking within the vacant parking space 103. The automated parking traveling control performed here may be a control (of type 2) performed while being monitored from outside the vehicle by the driver who has alighted.

Figure 5:
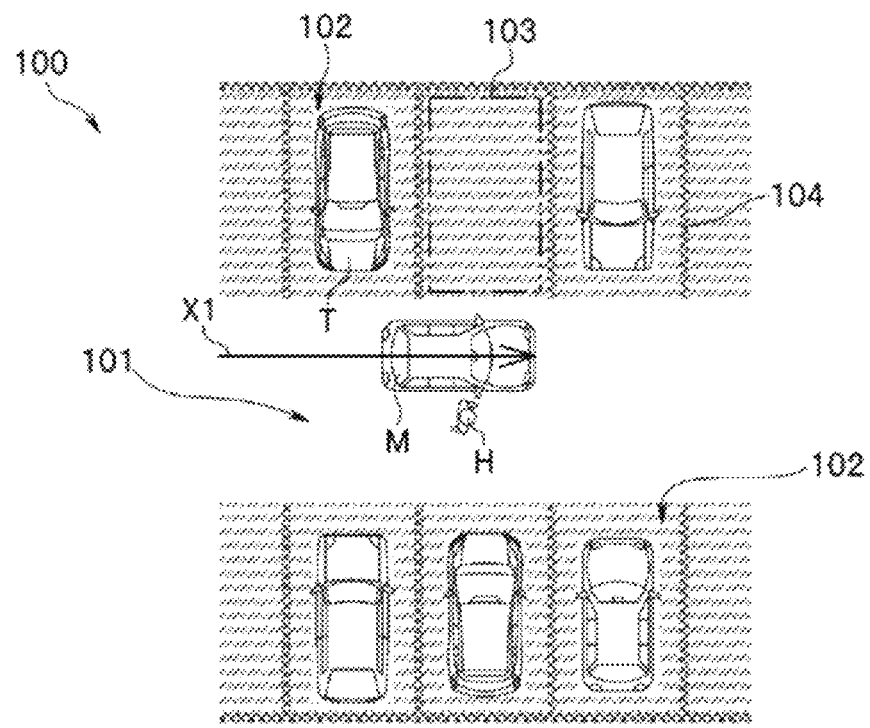
FIG. 5 is a conceptual diagram corresponding to a situation when processes of steps S21 and S22 in FIG. 2 are performed.

FIG. 5 is a conceptual diagram corresponding to a situation when the processes of steps S21 and S22 in FIG. 2 are performed. The situation illustrated in FIG. 5 indicates that the internal passage 101 is in a situation where snow has been removed or a situation where no snow has accumulated, and the regions of the parking spaces 102 are in a situation where snow has not been removed or a situation where snow has accumulated.

Therefore, in FIG. 5, a situation where snow has not been removed is indicated by dotted-line hatching. The situation at this time can be a situation where the division line 104 indicating the parking space on the road surface is also visually unrecognizable due to snow accumulation. The division line 104 is indicated by cross-hatching in FIG. 5. Although not illustrated, the parking space 102 in this case may be recognized by, for example, recognizing the management data regarding the parking lot, or a three-dimensional object such as a parking block, as described above. Note that signs in the drawings may indicate similar meanings in the following drawings and descriptions.

The situation illustrated in FIG. 5 is a situation similar to the situation illustrated in FIG. 3, but differs in that the regions of the parking spaces 102 are in a situation where snow has not been removed or a situation where snow has accumulated. In other words, the situation illustrated in FIG. 5 indicates a state in which the own vehicle M is stopped on the internal passage 101 near the detected vacant parking space 103 ("Y" in step S12). At this time, it is recognized that the internal passage 101 is in a situation where snow has been removed or a situation where no snow has accumulated, and the regions of the parking spaces 102 are in a situation where snow has not been removed or a situation where snow has accumulated ("Y" in step S13 and "N" in step S14).

Figure 6:
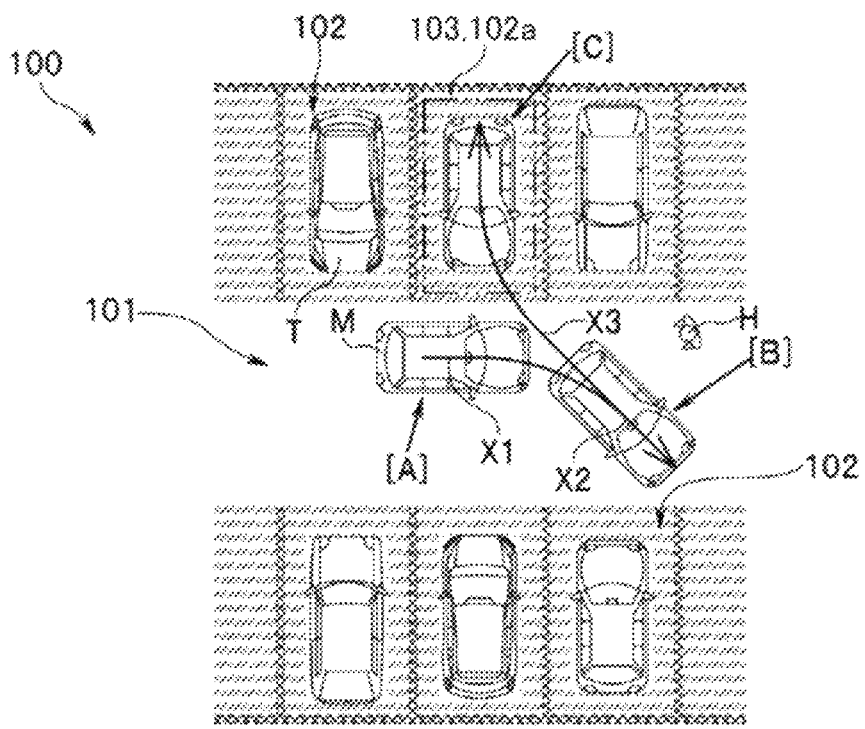
FIG. 6 is a conceptual diagram corresponding to a situation when a process of step S23 in FIG. 2 is performed.

Furthermore, the situation illustrated in FIG. 5 indicates a state in which, as described in step S22, the occupant (e.g., an occupant such as a driver H) has alighted from the own vehicle M stopped at the predetermined position on the internal passage 101 near the detected vacant parking space 103. Note that FIGS. 5 and 6 illustrate the occupant such as the driver H as an example of the occupant who alights from the own vehicle M, as will be described later. However, the alighting occupant is not limited to the example. For example, as the occupant who alights from the own vehicle M, another unillustrated passenger may be present in addition to the occupant such as the driver H.

As described above, in the process of step S23 in FIG. 2, the automated parking control may be executed after the occupant such as the driver H alights from the own vehicle M. At this time, as illustrated in FIG. 6, the occupant such as the driver H may move, on the internal passage 101, to a predetermined position that prevents hindrance to traveling of the own vehicle M.

FIG. 6 is a conceptual diagram corresponding to a situation when the process of step S23 in FIG. 2 is performed. The situation illustrated in FIG. 6 indicates, as with FIG. 5, that the internal passage 101 is in a situation where snow has been removed or a situation where no snow has accumulated, and the regions of the parking spaces 102 are in a situation where snow has not been removed or a situation where snow has accumulated. FIG. 6 illustrates a state in which, under the situation, the own vehicle M performs the automated parking control toward the vacant parking space 103.

An operation of the automated parking control illustrated in FIG. 6 may be substantially similar to the operation illustrated in FIG. 4 described above, but may differ in that the automated parking control (step S23 in FIG. 2) performed under the situation in FIG. 6 is the control (of type 2) performed in a state in which the occupant such as the driver H has alighted from the own vehicle M and is monitoring the own vehicle M from outside the vehicle.

In this manner, the automated parking control by the process of step S23 described above may be completed, and the processing sequence may be ended. The completion of the automated parking control may be determined in a manner similar to that in the process of step S15 described above.

In contrast, in the process of step S21 described above, if the own vehicle M is unable to wait for the predetermined time period in the stopped state on the internal passage 101, for example, if another vehicle is approaching the own vehicle M on the internal passage 101 ("N" in step S21), the flow may proceed to step S31. In the process of step S21 described above, also if the own vehicle M is not configured to perform an automated parking operation ("N" in step S21), the flow may proceed to step S31.

In step S31, the traveling ECU 14 may perform the parking traveling control of parking the own vehicle M within the vacant parking space 103, or the parking assistance control.

Note that conditions for the flow to proceed from step S21 to step S31 may include the following three cases.
  (1) A case where the own vehicle M is unable to wait in the stopped state on the internal passage 101 for the predetermined time period, and
    (1a) where the own vehicle M is configured to perform an automated parking operation, or
    (1b) where the own vehicle M is not configured to perform an automated parking operation.
  (2) A case where the own vehicle M is able to wait in the stopped state on the internal passage 101 for the predetermined time period, and where the own vehicle M is not configured to perform an automated parking operation.

In the case (1a), parking within the vacant parking space 103 may be performed by the automated parking control. The automated parking control performed at this time may be substantially similar to the operation described with reference to FIG. 4 described above, i.e., the control of type 1.

In the cases (1b) and (2), parking within the vacant parking space 103 may be performed by a manual parking operation by the driver. In this case, the traveling ECU 14 may perform the parking assistance control in accordance with the driver's manual operation. An operation at this time may be substantially similar to the operation described with reference to FIG. 4 described above.

In this manner, the process of step S31 described above, i.e., parking of the own vehicle M within the vacant parking space 103, may be completed, and the flow may proceed to step S32.

At this time, the own vehicle M may be in a state of being parked within the predetermined parking space 102 that has been the vacant parking space 103, as a result of the process of step S31 described above. Hence, in the following description, a new reference sign 102a is used to denote a parking space where the own vehicle M is parked and that has been recognized as the vacant parking space 103 before parking of the own vehicle. In other words, the parking space 102a illustrated in FIGS. 6 and 7 indicates the same region as the vacant parking space 103 indicated by the dashed and double-dotted line.

In step S32, the traveling ECU 14 may perform an alighting region generation process for generation of an alighting region 105 (see FIG. 7) within the parking space 102a. The alighting region 105 may refer to a road surface region through which the occupant is to pass when the occupant alights from the own vehicle M. The alighting region generation process may be a traveling control process of improving, within the parking space 102a where the own vehicle M is parked, a surrounding region of the own vehicle M (e.g., both sideward regions of the own vehicle M) to resolve a snow accumulation situation. In one embodiment, the alighting region generation process may serve as a "region generation traveling control".

For example, as will be described later, the alighting region generation process may be a process of stamping down accumulated snow in a predetermined region for improvement, with the wheels of the own vehicle M, to thereby bring about a road surface situation where it is easier for the occupant to pass through the region. By performing the alighting region generation process, accumulated snow that hinders passage of the occupant is removed, which allows the occupant to easily alight and to easily pass through the region. In this manner, the process of step S32 may be completed, and the flow may proceed to step S33.

Figure 7:
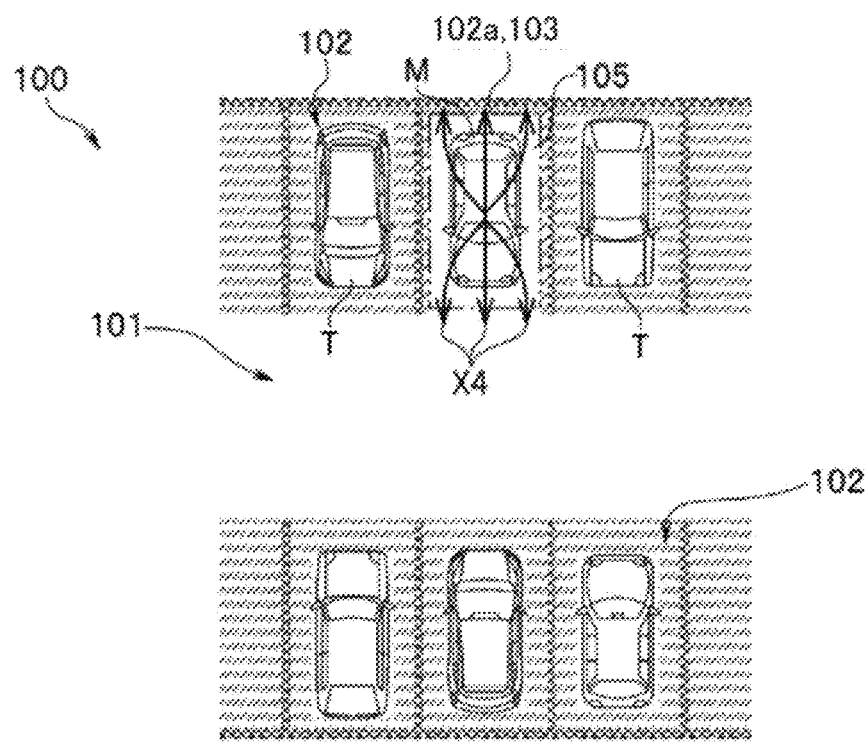
FIG. 7 is a conceptual diagram corresponding to a situation when a process of step S32 in FIG. 2 is performed.

A detailed operation of the alighting region generation process may be, for example, as illustrated in FIG. 7. FIG. 7 is a conceptual diagram corresponding to a situation when the process of step S32 in FIG. 2 is performed.

At this time, as illustrated in FIG. 6, the own vehicle M may be in a state of being parked within the parking space 102a that has been the vacant parking space 103, as a result of the process of step S31 described above. In this state, the own vehicle M may perform forward and backward movement within a range of the parking space 102a. At the same time, the traveling ECU 14 may perform a steering control by a predetermined amount in a predetermined direction, to cause movement of the own vehicle M in the width direction (see an arrow X4 in FIG. 7). An amount of the movement in the width direction in each forward or backward movement in this case may be, for example, about a width dimension corresponding to one wheel. Such forward and backward movement and movement in the width direction may be repeated to generate the desired alighting region 105. Note that the automated traveling control of the forward and backward movement and the movement in the width direction may be constantly performed with attention given to, for example, presence of the other vehicle T or a passing person around the own vehicle M.

The alighting region 105 in this case may be generated as appropriate, depending on a situation of the occupant of the own vehicle M. The situation of the occupant of the own vehicle M may be recognized based on, for example, a result of recognizing a vehicle inside situation by an unillustrated vehicle inside camera. In this case, for example, when the occupant is the driver, the alighting region 105 may be at least a region on a driver's seat side of the sideward regions of the own vehicle M. For example, when the occupant is present on a passenger seat or one side or both sides of rear seats, a traveling control may be performed as appropriate in such a manner that the corresponding region is included in the alighting region 105.

Furthermore, at this time, when the other vehicle T is already parked within the parking space 102 adjacent to the parking space 102a of the own vehicle M, for example, the alighting region 105 may be generated in consideration of a distance between the own vehicle M and the other vehicle T.

In step S33, the traveling ECU 14 may perform the automated parking control for stopping of the own vehicle M in substantially the middle of the parking space 102.

In this manner, the alighting region generation process and the automated parking control by the processes of steps S32 and S33 described above may be completed, and the processing sequence may be ended. The completion of the automated parking control may be determined in a manner similar to that in the processes of steps S15 and S23 described above.

In contrast, in the process of step S13 described above, if it is determined that the internal passage 101 is in a situation where snow has not been removed or a situation where snow has accumulated, the flow may proceed to step S41.

Note that, if the internal passage 101 is in a situation where snow has not been removed or a situation where snow has accumulated, it is assumed that the regions of the parking spaces 102 are also in a situation where snow has not been removed or a situation where snow has accumulated.

Hence, in this case, in step S41, the traveling ECU 14 may determine, based on the surrounding environment data acquired by the surrounding environment recognition device, whether the own vehicle M is in a situation of being able to wait for a predetermined time period in a stopped state on the internal passage 101. At the same time, the traveling ECU 14 may determine whether the own vehicle M is configured to perform an automated parking operation. Each process of the determination performed here may be substantially similar to the process of step S21 described above.

In the process of step S41, if it is determined that the own vehicle M is able to wait for the predetermined time period in the stopped state on the internal passage 101, and it is determined that the own vehicle M is configured to perform an automated parking operation ("Y" in step S41), the flow may proceed to step S42.

Figure 8:
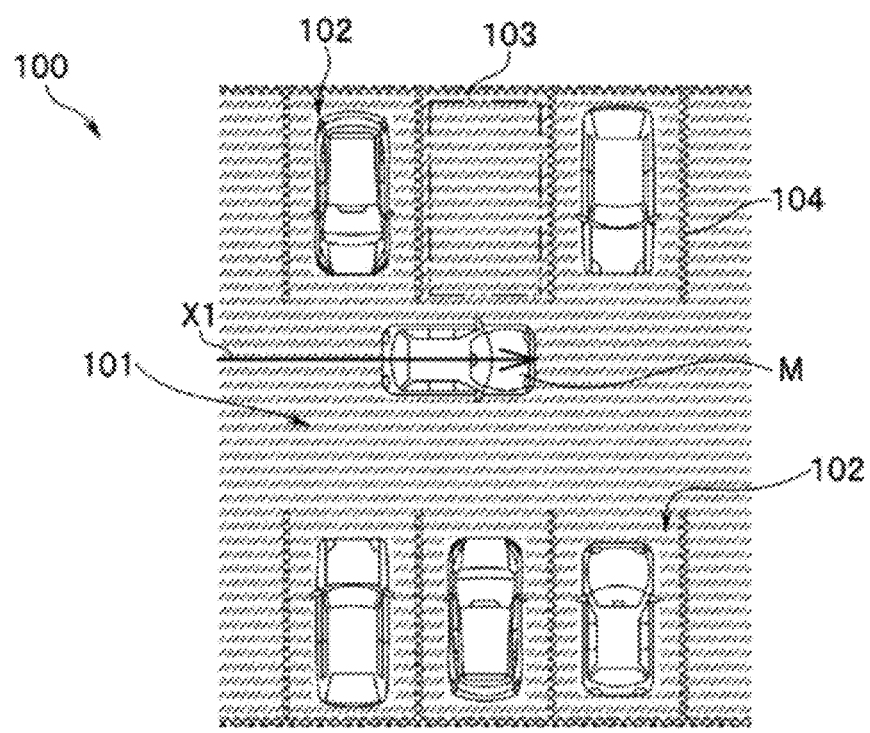
FIG. 8 is a conceptual diagram corresponding to a situation when a process of step S41 in FIG. 2 is performed.

FIG. 8 is a conceptual diagram corresponding to a situation when the process of step S41 in FIG. 2 is performed. The situation illustrated in FIG. 8 is a situation similar to the situation illustrated in FIGS. 3 and 5, but differs in that the internal passage 101 and the regions of the parking spaces 102 are in a situation where snow has not been removed or a situation where snow has accumulated. In other words, the situation illustrated in FIG. 8 indicates a state in which the own vehicle M is stopped on the internal passage 101 near the detected vacant parking space 103 ("Y" in step S12). At this time, it is recognized that the internal passage 101 and the regions of the parking spaces 102 are in a situation where snow has not been removed or a situation where snow has accumulated ("N" in step S13).

Figure 9:
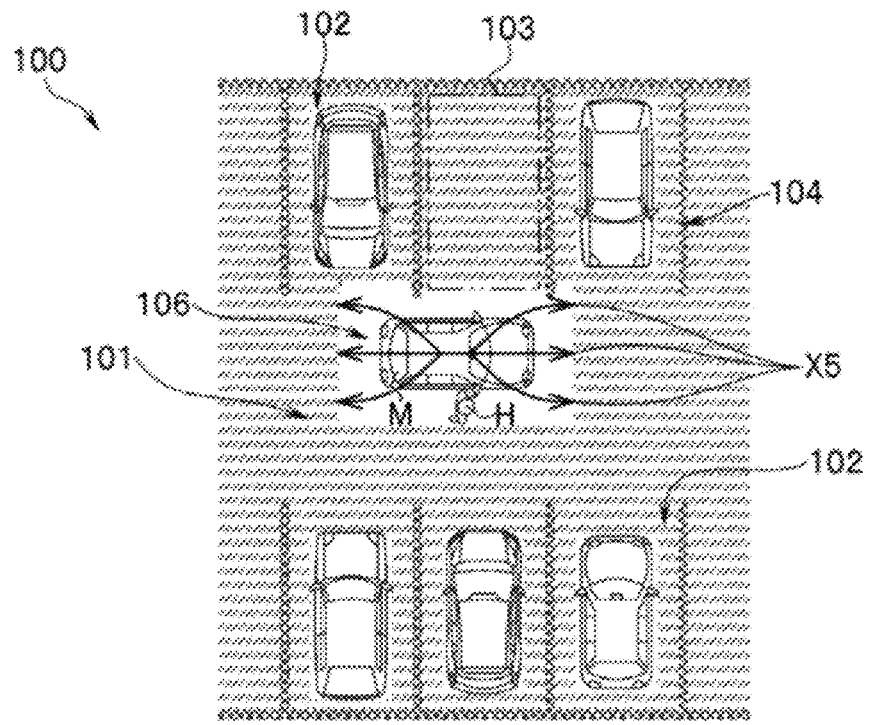
FIG. 9 is a conceptual diagram corresponding to a situation when a process of step S42 in FIG. 2 is performed.

The process of step S42 in FIG. 2 may be executed under the situation illustrated in FIG. 8. In step S42, the traveling ECU 14 may perform, at a stopping position on the internal passage 101, the alighting region generation process for generation of an alighting region 106 illustrated in FIG. 9. The alighting region generation process performed here may be substantially similar to the process performed in step S32 described above. The alighting region 106 may refer to a road surface region through which the occupant is to pass on the internal passage 101 after alighting from the own vehicle M, as illustrated in FIG. 9. The alighting region generation process performed here allows the occupant to easily alight from the own vehicle M stopped on the internal passage 101, and to easily pass through the alighting region.

A detailed operation of the alighting region generation process may be, for example, as illustrated in FIG. 9. FIG. 9 is a conceptual diagram corresponding to a situation when the process of step S42 in FIG. 2 is performed. The situation illustrated in FIG. 9 indicates that the internal passage 101 and the regions of the parking spaces 102 are both in a situation where snow has not been removed or a situation where snow has accumulated, as described with reference to FIG. 8. FIG. 9 also illustrates a state in which, after the alighting region generation process on the internal passage 101, the occupant (e.g., the occupant such as the driver H) has alighted from the own vehicle M stopped on the generated alighting region.

FIG. 9 illustrates the occupant such as the driver H as an example of the occupant who alights from the own vehicle M. However, the alighting occupant is not limited to the example. As the occupant who alights from the own vehicle M, another unillustrated passenger may be present in addition to the occupant such as the driver H.

First, the own vehicle M may be stopped at the predetermined position on the internal passage 101, as illustrated in FIG. 8 described above. In this state, the own vehicle M may perform forward and backward movement and movement in the width direction, within a predetermined range on the internal passage 101 (see an arrow X5 in FIG. 9). Such forward and backward movement and movement in the width direction may be repeated to generate the desired alighting region 106 on the internal passage 101. Note that the automated traveling control of the forward and backward movement and the movement in the width direction may be constantly performed with attention given to, for example, presence of the other vehicle T or a passing person around the own vehicle M. The alighting region 106 in this case may be generated as appropriate, depending on the situation of the occupant of the own vehicle M, as in the process of step S32 described above.

In this manner, the alighting region generation process in step S42 described above may be completed, and the flow may proceed to step S43.

In step S43, the traveling ECU 14 may perform the process of determining the alighting situation of the occupant, while keeping the stopped state of the own vehicle M within the alighting region 106 generated on the internal passage 101. The process of determining the alighting situation of the occupant performed here may be similar to the determination process performed in the process of step S22 described above. In other words, the occupant may alight from the own vehicle M onto the alighting region 106 at this point in time.

If it is determined that the occupant has alighted, the flow may proceed to step S44. In step S44, the traveling ECU 14 may execute the automated parking control of parking within the vacant parking space 103. The automated parking traveling control performed here may be the control (of type 2) performed while being monitored from outside the vehicle by the driver who has alighted, as with the traveling control executed in the process of step S23 described above.

Figure 10:
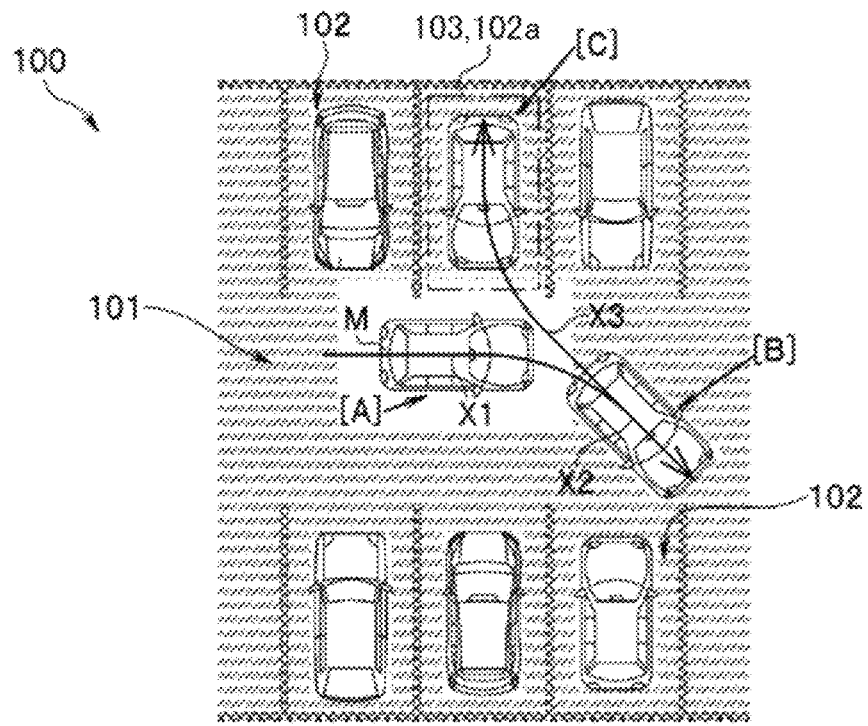
FIG. 10 is a conceptual diagram corresponding to a situation when a process of step S44 in FIG. 2 is performed.
Figure 11:
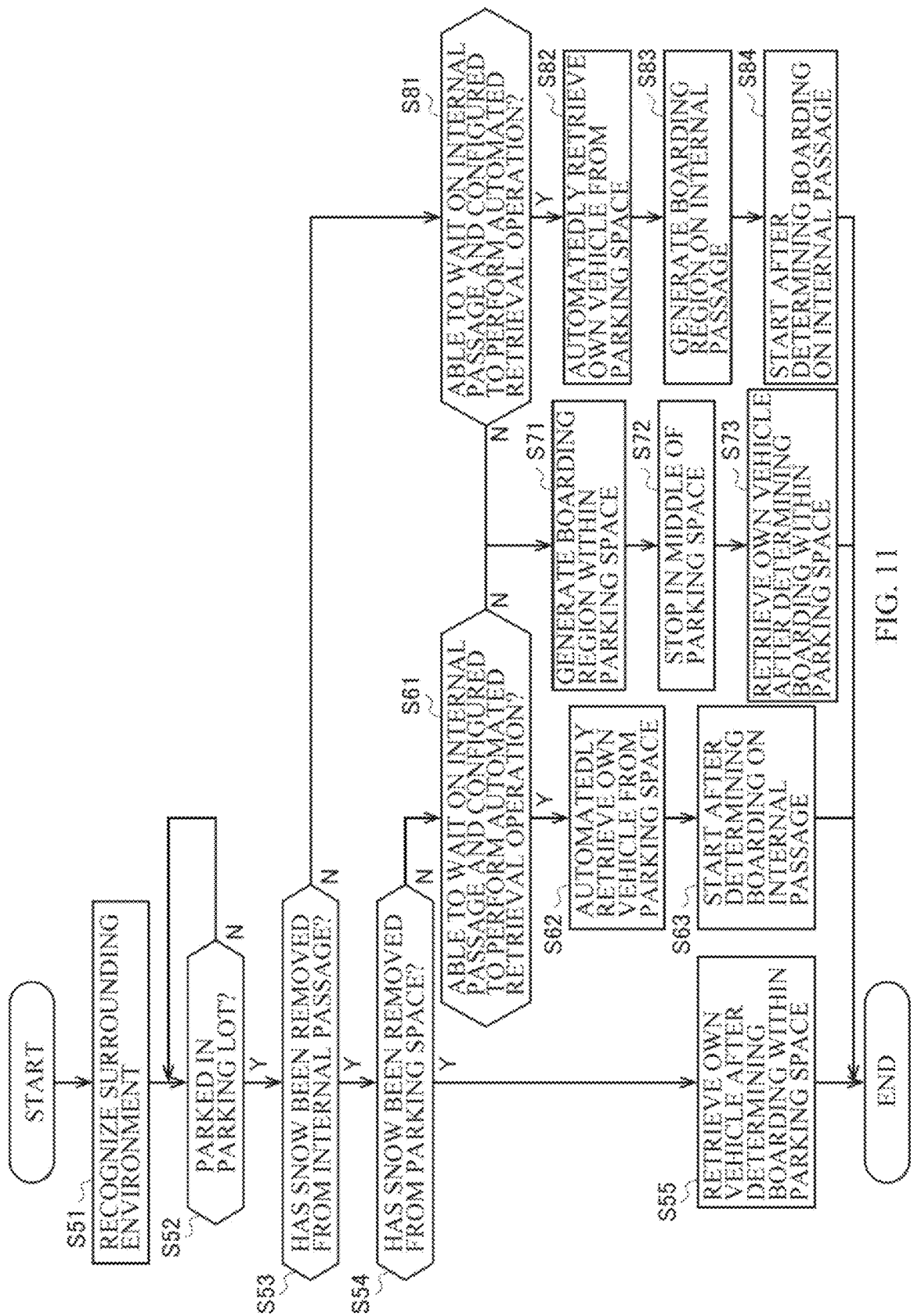
FIG. 11 is a flowchart illustrating, of operations of the vehicle traveling control apparatus according to one example embodiment of the disclosure, an operation performed when the vehicle parked in a place such as a parking lot is retrieved.

FIG. 10 is a conceptual diagram corresponding to a situation when the process of step S44 in FIG. 2 is performed. The situation illustrated in FIG. 10 indicates, as with FIGS. 8, and 9, that the internal passage 101 and the regions of the parking spaces 102 are in a situation where snow has not been removed or a situation where snow has accumulated. FIG. 10 illustrates a state in which, under the situation, the own vehicle M performs the automated parking control toward the vacant parking space 103.

An operation of the automated parking control illustrated in FIG. 10 may be substantially similar to the operation illustrated in FIGS. 4 and 6 described above. The automated parking control (step S44 in FIG. 2) performed under the situation in FIG. 10 may be the control (of type 2) performed in a state in which the driver has alighted from the own vehicle M and is monitoring the own vehicle M from outside the vehicle.

In this manner, the automated parking control by the process of step S44 described above may be completed, and the processing sequence may be ended. The completion of the automated parking control may be determined in a manner similar to that in the processes of steps S15, S23, and S33 described above.

In contrast, in the process of step S41 described above, if the own vehicle M is unable to wait for the predetermined time period in the stopped state on the internal passage 101 ("N" in step S41), the flow may proceed to step S31. In the process of step S41 described above, also if the own vehicle M is not configured to perform an automated parking operation ("N" in step S41), the flow may proceed to step S31.

The processes of step S31 to S33 in this case (the case where the flow proceeds from step S41 to step S31) may be substantially similar to steps S31 to S33 in the operation described with reference to FIGS. 6 and 7 described above (the case where the flow proceeds from step S21 to step S31). Thus, illustration and a detailed description of the operation of the processes are omitted.

Note that the situation when the flow proceeds from step S41 to step S31 differs from the situation illustrated in FIGS. 6 and 7 in that the internal passage 101 is also in a situation where snow has not been removed or a situation where snow has accumulated.

Next, a description is given below of an operation performed when the own vehicle parked within a predetermined parking space in a place such as a parking lot is retrieved, with reference to a flowchart of FIG. 11.

A processing sequence illustrated by the flowchart of FIG. 11 indicates a flow of an operation performed when the own vehicle M is retrieved, in a situation where the own vehicle M mounted with the vehicle traveling control apparatus 1 according to the example embodiment is parked within a predetermined parking space in a place such as a parking lot. Assumed as the surrounding environment of the own vehicle at this time is, for example, under a snow accumulation situation.

When retrieving the own vehicle M parked in the place such as the parking lot, the driver of the own vehicle M may first, for example, unlock the door of the own vehicle M by a remote operation using what is called a smart key system, and activate the vehicle traveling control apparatus 1.

Thus, in step S51 of FIG. 11, the traveling ECU 14 of the vehicle traveling control apparatus 1 may start to recognize the surrounding situation of the own vehicle M, based on, for example, the surrounding environment data acquired as appropriate by the surrounding environment recognition device.

Thereafter, in step S52, the traveling ECU 14 may determine, based on the surrounding environment data acquired by the surrounding environment recognition device, whether the own vehicle M is parked inside a predetermined parking lot. If it is determined that the own vehicle M is parked inside a parking lot ("Y" in step S52), the flow may proceed to step S53. If it is not determined that the own vehicle M is parked inside a predetermined parking lot ("N" in step S52), the traveling ECU 14 may repeat similar determination.

Although not illustrated, for example, if it is not detected that the own vehicle M is parked in a predetermined parking lot for a predetermined time period or more, or if the process is canceled by the driver, the processing sequence may be ended.

Figure 12:
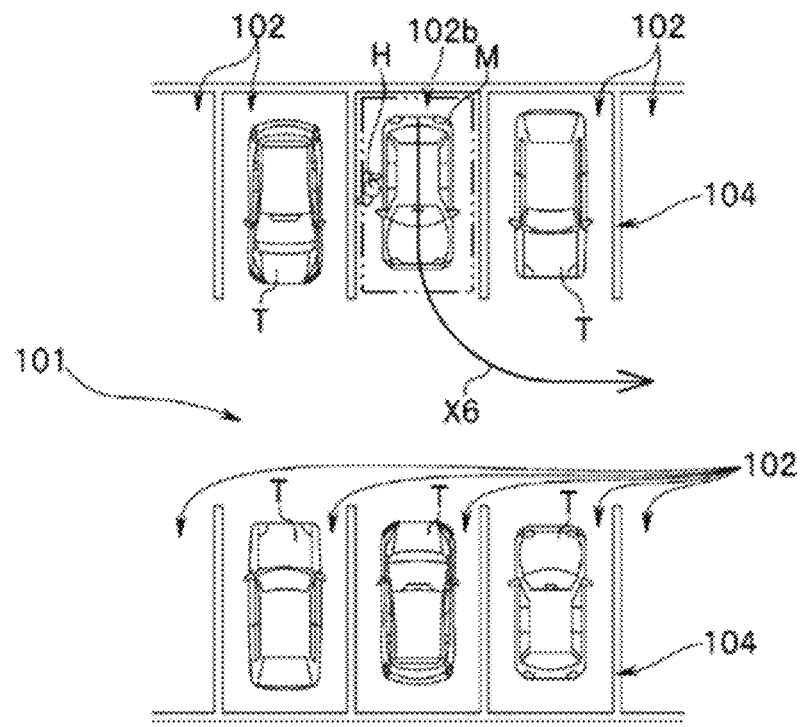
FIG. 12 is a conceptual diagram corresponding to a situation when processes of steps S52 to S55 in FIG. 11 are performed.

FIG. 12 is a conceptual diagram corresponding to a situation when processes of step S52 to S55 in FIG. 11 are performed. The situation illustrated in FIG. 12 indicates a state in which the own vehicle M is parked within one (see a reference sign 102b) of the parking spaces 102 ("Y" in step S52).

At this time, it is recognized that the internal passage 101 and the regions of the parking spaces 102 are in a situation where snow has been removed or a situation where no snow has accumulated ("Y" in step S53 and "Y" in step S54). Reference signs in the drawings including FIG. 12 may be similar to those in the drawings including FIG. 3 described above.

An arrow X6 indicates a traveling path and a direction when the own vehicle M parked within the parking space 102b is retrieved. The reference sign H denotes the occupant such as the driver who is about to board the parked own vehicle M. Note that, of the parking spaces 102, the parking space where the own vehicle M is parked (see the dashed and double-dotted line) is denoted by the reference sign 102b. The parking space 102b may serve as a parking position of the own vehicle M.

In the situation illustrated in FIG. 12, the internal passage 101 and the regions of the parking spaces 102 are in a situation where snow has been removed or a situation where no snow has accumulated. Accordingly, the situation illustrated in FIG. 12 is assumed to be a situation where the occupant of the own vehicle M, including the occupant such as the driver H, is able to approach the parked own vehicle M to easily board the own vehicle M.

In step S53 of FIG. 11, the traveling ECU 14 may determine, based on the surrounding environment data acquired by the surrounding environment recognition device, whether the internal passage 101 of the parking lot 100 is in a situation where snow has been removed or a situation where no snow has accumulated. If it is determined that the internal passage 101 is in a situation where snow has been removed or a situation where no snow has accumulated ("Y" in step S53), the flow may proceed to step S54 (see FIG. 12). If it is determined that the internal passage 101 is in a situation where snow has not been removed or a situation where snow has accumulated ("N" in step S53), the flow may proceed to step S81 to be described later.

In step S54, the traveling ECU 14 may determine, based on the surrounding environment data acquired by the surrounding environment recognition device, whether the regions of the parking spaces 102 in the parking lot 100 are in a situation where snow has been removed or a situation where no snow has accumulated. If it is determined that the regions of the parking spaces 102 are in a situation where snow has been removed or a situation where no snow has accumulated ("Y" in step S54), the flow may proceed to step S55. If it is determined that the regions of the parking spaces 102 are in a situation where snow has not been removed or a situation where snow has accumulated ("N" in step S54), the flow may proceed to step S61.

In step S55, the traveling ECU 14 may determine the boarding of the occupant such as the driver of the own vehicle M, and thereafter perform a traveling control of retrieving the own vehicle M from the parking space 102b where the own vehicle M is parked. The boarding of the occupant may be determined, for example, by detecting the output of the door sensor 39, or by using the vehicle inside monitoring system such as a vehicle inside camera included in the HMI 31. The traveling control of retrieving the own vehicle M may be performed by using a normal automated driving operation of the vehicle traveling control apparatus 1 of the own vehicle M, or by a manual driving operation by the driver.

Thus, as illustrated in FIG. 12, the own vehicle M may travel along the arrow X6 from the parking space 102b where the own vehicle M is parked, onto the internal passage 101, and thereafter exit the parking lot 100. Thereafter, the processing sequence may be ended.

In contrast, in the process of step S54 described above, if it is determined that the regions of the parking spaces 102 are in a situation where snow has not been removed or a situation where snow has accumulated, the flow may proceed to step S61.

In step S61, the traveling ECU 14 may determine, based on the surrounding environment data acquired by the surrounding environment recognition device, whether the own vehicle M is in a situation of being able to wait for a predetermined time period in a stopped state on the internal passage 101, when the own vehicle M is retrieved from the parking space 102b where the own vehicle M is currently parked. At the same time, the traveling ECU 14 may determine whether the own vehicle M is configured to perform an automated retrieval operation. Assumed as the situation where the own vehicle M is able to wait for the predetermined time period in the stopped state on the internal passage 101 after being retrieved from the parking space 102b may be, for example, a case where there is no other vehicle on the internal passage 101 around the own vehicle M.

If it is determined that the own vehicle M after being retrieved from the parking space 102b is able to wait for the predetermined time period in the stopped state on the internal passage 101, and it is determined that the own vehicle M is configured to perform an automated retrieval operation ("Y" in step S61), the flow may proceed to step S62.

In step S62, the traveling ECU 14 may execute an automated retrieval control of retrieving the own vehicle M from the parking space 102b where the own vehicle M is parked, onto the internal passage 101. The automated retrieval control performed here may be the control (of type 2) performed while being monitored from outside the vehicle by the driver who has alighted.

Figure 13:
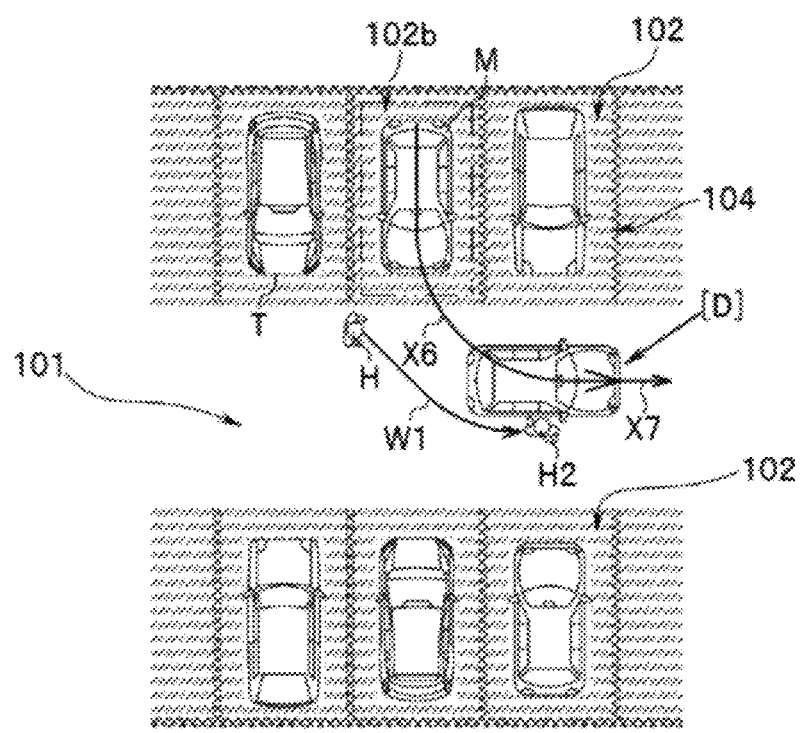
FIG. 13 is a conceptual diagram corresponding to a situation when a process of step S62 in FIG. 11 is performed.

FIG. 13 is a conceptual diagram corresponding to a situation when the process of step S62 in FIG. 11 is performed. The situation illustrated in FIG. 13 indicates that the internal passage 101 is in a situation where snow has been removed or a situation where no snow has accumulated, and the regions of the parking spaces 102 are in a situation where snow has not been removed or a situation where snow has accumulated. FIG. 13 illustrates a state in which, under the situation, the own vehicle M performs the automated retrieval control from the parking space 102b.

At this time, the occupant such as the driver H may stand near the own vehicle M parked within the parking space 102b, and monitor the own vehicle M from outside the vehicle, as illustrated in FIG. 13. In this state, the own vehicle M may execute the process of step S62 described above (the automated retrieval control). By the automated retrieval control, the own vehicle M may be retrieved, along the arrow X6 in FIG. 13, from the parking space 102b to the internal passage 101.

The own vehicle M may thereafter temporarily stop at a predetermined position [D] on the internal passage 101. Thus, the automated retrieval control may be completed. Upon completion of the automated retrieval control, the flow may proceed to step S63.

At the predetermined stopping position [D] of the own vehicle M illustrated in FIG. 13, the road surface of the internal passage 101 is in a situation where snow has been removed or no snow has accumulated. Accordingly, in this situation, the occupant such as the driver is able to easily board the own vehicle M. A reference sign H2 illustrated in FIG. 13 denotes the occupant such as the driver who is about to board the own vehicle M stopped at the predetermined stopping position [D] on the internal passage 101. During the automated retrieval control of the own vehicle M, the occupant such as the driver may monitor the own vehicle M at the position denoted by the reference sign H in FIG. 13. When the own vehicle M stops at the predetermined stopping position [D] on the internal passage 101, the occupant such as the driver may move, along an arrow W1, from the position denoted by the reference sign H to the position denoted by the reference sign H2. The occupant such as the driver H2 may thereafter board the own vehicle M.

Thereafter, in step S63 of FIG. 11, the traveling ECU 14 may determine the boarding of the occupant such as the driver of the own vehicle M, and thereafter perform a traveling control of starting the own vehicle M from the position [D] where the own vehicle M is stopped (see an arrow X7 in FIG. 13). The boarding of the occupant may be determined in a manner similar to that in the process of step S55 described above. Thereafter, the processing sequence may be ended.

In contrast, in the process of step S61 described above, if the own vehicle M after being retrieved from the parking space 102b is unable to wait for the predetermined time period in the stopped state on the internal passage 101, the flow may proceed to step S71. Also if the own vehicle M is not configured to perform an automated retrieval operation, the flow may proceed to step S71.

In step S71, the traveling ECU 14 may perform a boarding region generation process for generation of a boarding region 107 (see FIG. 14) within the parking space 102*b*. The boarding region 107 may refer to a road surface region through which the occupant is to pass when the occupant boards the own vehicle M. The boarding region generation process may be a traveling control process of resolving, within the parking space 102*b* where the own vehicle M is parked, a snow accumulation situation of a surrounding region of the own vehicle M (e.g., both sideward regions of the own vehicle M). In one embodiment, the boarding region generation process may serve as the "region generation traveling control".

For example, the boarding region generation process may be a process of, in a manner substantially similar to that in the alighting region generation process described above, stamping down accumulated snow in a predetermined region, with the wheels of the own vehicle M, to thereby bring about a road surface situation where it is easier for the occupant to pass through the region. By performing the boarding region generation process, accumulated snow that hinders passage of the occupant is removed, which allows the occupant to easily approach the own vehicle M and to easily board. Thus, the process of step S71 may be completed, and the flow may proceed to step S72.

The boarding region generation process (see FIG. 14) may be substantially similar to the alighting region generation process (see FIG. 7) in the process of step S32 in FIG. 2 described above. Note that the boarding region generation process performed here may be, when the own vehicle M is configured to perform an automated retrieval operation, the control (of type 2) performed while being monitored from outside the vehicle by the driver who has alighted.

When the own vehicle M is not configured to perform an automated retrieval operation, the boarding region generation process may be performed by a manual driving operation by the driver under a traveling assistance control. In this case, first, the driver may pass through the parking space 102*b* under the snow accumulation situation to board the own vehicle M, and thereafter the boarding region generation process may be performed.

Thereafter, in step S72, the traveling ECU 14 may stop the own vehicle M in substantially the middle of the parking space 102*b*. Thereafter, in a case where the boarding region generation process has been performed by the automated retrieval operation, the occupant such as the driver may board the own vehicle M. In a case where the boarding region generation process has been performed by the manual operation involving the traveling assistance control, the occupant other than the driver may board the own vehicle M.

Figure 14:
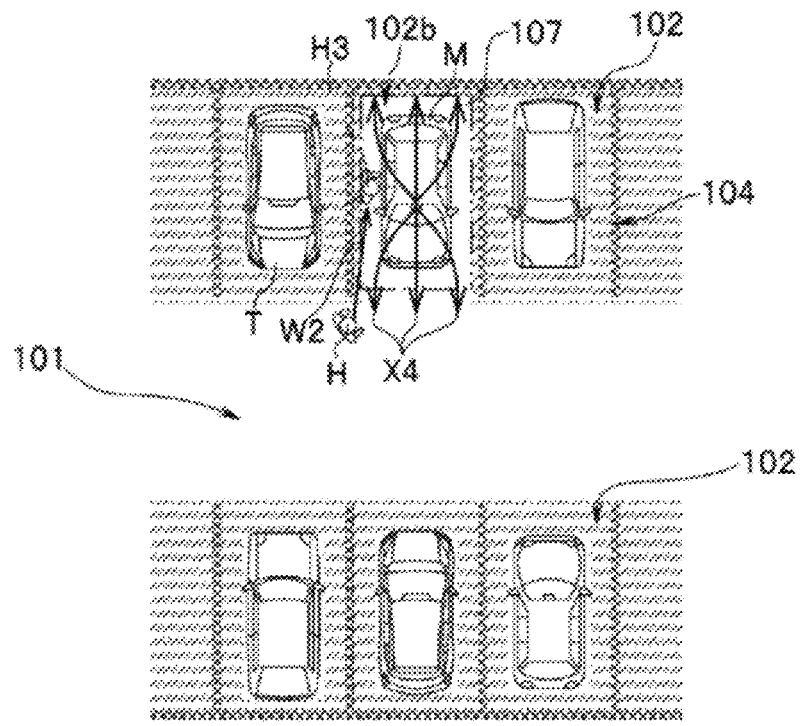
FIG. 14 is a conceptual diagram corresponding to a situation when a boarding region generation process of steps S71 and S72 in FIG. 11 is performed.

FIG. 14 is a conceptual diagram corresponding to a situation when the boarding region generation process of steps S71 and S72 in FIG. 11 is performed. During execution of the boarding region generation process by the automated retrieval operation, the occupant such as the driver H may monitor the own vehicle M from outside the vehicle, on the internal passage 101 in a region near the own vehicle M, as illustrated in FIG. 14. When the boarding region generation process is completed and the stopping of the own vehicle M at the middle position within the parking space 102*b* is completed, the occupant such as the driver H may move, along an arrow W2, to the position denoted by a reference sign H3 in FIG. 14, and board the own vehicle M.

Thereafter, in step S73, the traveling ECU 14 may determine the boarding of the occupant such as the driver of the own vehicle M, and thereafter perform a traveling control of retrieving the own vehicle M from the parking space 102*b* where the own vehicle M is parked. The retrieval traveling control at this time may be performed by a normal automated driving operation or by the driver's manual driving operation involving an assistance control, in a manner substantially similar to that in the process of step S55 described above.

Figure 15:
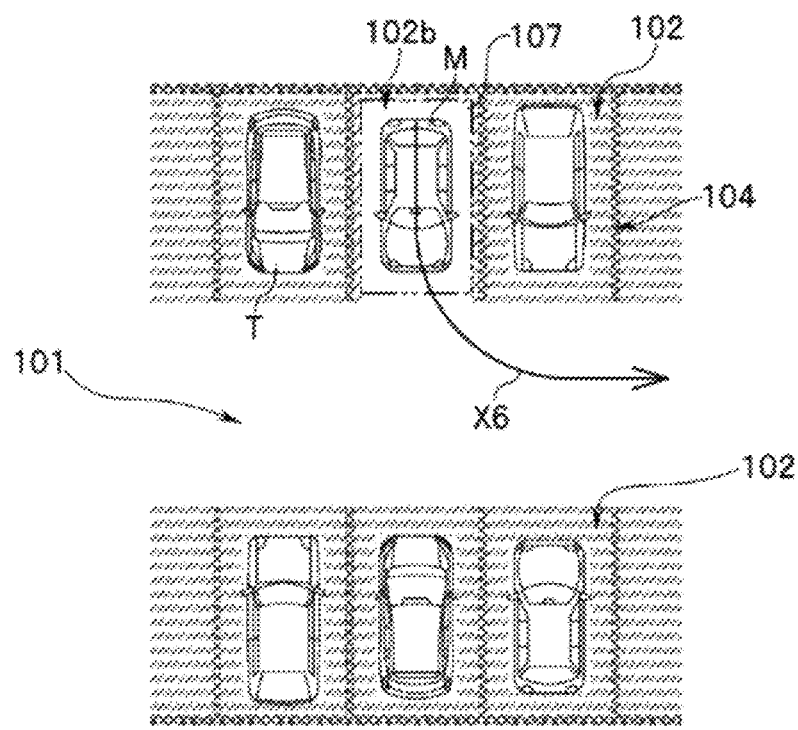
FIG. 15 is a conceptual diagram corresponding to a situation when a process (a retrieval traveling control) of step S73 in FIG. 11 is performed.

FIG. 15 is a conceptual diagram corresponding to a situation when the process (the retrieval traveling control) of step S73 in FIG. 11 is performed. As illustrated in FIG. 15, the own vehicle M may travel along the arrow X6 from the parking space 102*b* where the own vehicle M is parked, onto the internal passage 101, and thereafter exit the parking lot 100. Thereafter, the processing sequence may be ended. An operation at this time may be substantially similar to that of the process of step S55 in FIG. 11 (see FIGS. 12 and 13).

In contrast, in the process of step S53 described above, if it is determined that the internal passage 101 is in a situation where snow has not been removed or a situation where snow has accumulated, the flow may proceed to step S81.

In this case, in step S81, the traveling ECU 14 may determine, based on the surrounding environment data acquired by the surrounding environment recognition device, whether the own vehicle M is in a situation of being able to wait for a predetermined time period in a stopped state on the internal passage 101, when the own vehicle M is retrieved from the parking space 102*b* where the own vehicle M is currently parked. At the same time, the traveling ECU 14 may determine whether the own vehicle M is configured to perform an automated retrieval operation. The determination process may be substantially similar to the process of step S61 described above.

If it is determined that the own vehicle M after being retrieved from the parking space 102*b* is able to wait for the predetermined time period in the stopped state on the internal passage 101, and it is determined that the own vehicle M is configured to perform an automated retrieval operation ("Y" in step S81), the flow may proceed to step S82.

In step S82, the traveling ECU 14 may execute an automated retrieval control of retrieving the own vehicle M from the parking space 102*b* where the own vehicle M is parked, onto the internal passage 101. The automated retrieval control performed here may be the control (of type 2) performed while being monitored from outside the vehicle by the driver who has alighted. The automated retrieval control may be similar to the process of step S62 described above.

Figure 16:
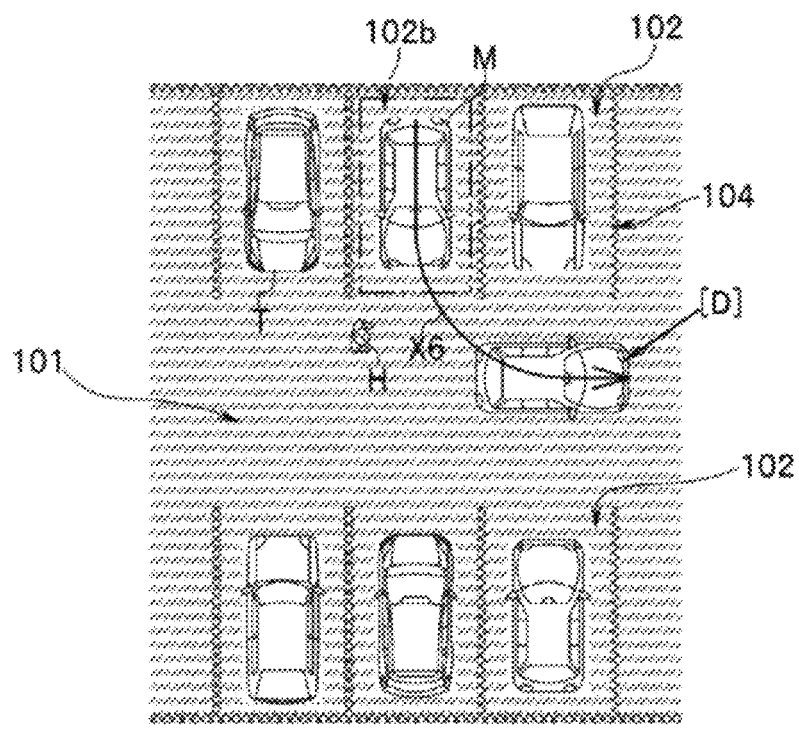
FIG. 16 is a conceptual diagram corresponding to a situation when a process of step S82 in FIG. 11 is performed.

FIG. 16 is a conceptual diagram corresponding to a situation when the process of step S82 in FIG. 11 is performed. The situation illustrated in FIG. 16 indicates that the internal passage 101 and the regions of the parking spaces 102 are in a situation where snow has not been removed or a situation where snow has accumulated. FIG. 16 illustrates a state in which, under the situation, the own vehicle M performs the automated retrieval control from the parking space 102*b*.

At this time, the occupant such as the driver H may stand near the own vehicle M parked within the parking space 102*b*, and monitor the own vehicle M from outside the vehicle, as illustrated in FIG. 16. In this state, the own vehicle M may execute the process of step S82 described above (the automated retrieval control).

By the automated retrieval control described above, the own vehicle M may be retrieved, along the arrow X6 in FIG. 16, from the parking space 102b to the internal passage 101. The own vehicle M may thereafter temporarily stop at the predetermined position [D] on the internal passage 101. Thus, the automated retrieval control may be completed. Upon completion of the automated retrieval control, the flow may proceed to step S83.

In step S83, the traveling ECU 14 may perform the boarding region generation process for generation of a boarding region 108 (see FIG. 17) at the predetermined stopping position [D] on the internal passage 101. The boarding region 108 may refer to a road surface region that allows the occupant to easily board the own vehicle M. The boarding region generation process itself may be substantially similar to the process of step S71 described above. Note that the boarding region generation process performed in step S82 may be the control (of type 2) performed while being monitored from outside the vehicle by the driver who has alighted. Upon completion of the boarding region generation process, the occupant such as the driver may board the own vehicle M. At this time, the boarding region generation process described above has been performed to remove accumulated snow that hinders passage, from the road surface of the surrounding region of the own vehicle M on the internal passage 101. This allows the occupant to easily board the own vehicle M.

Figure 17:
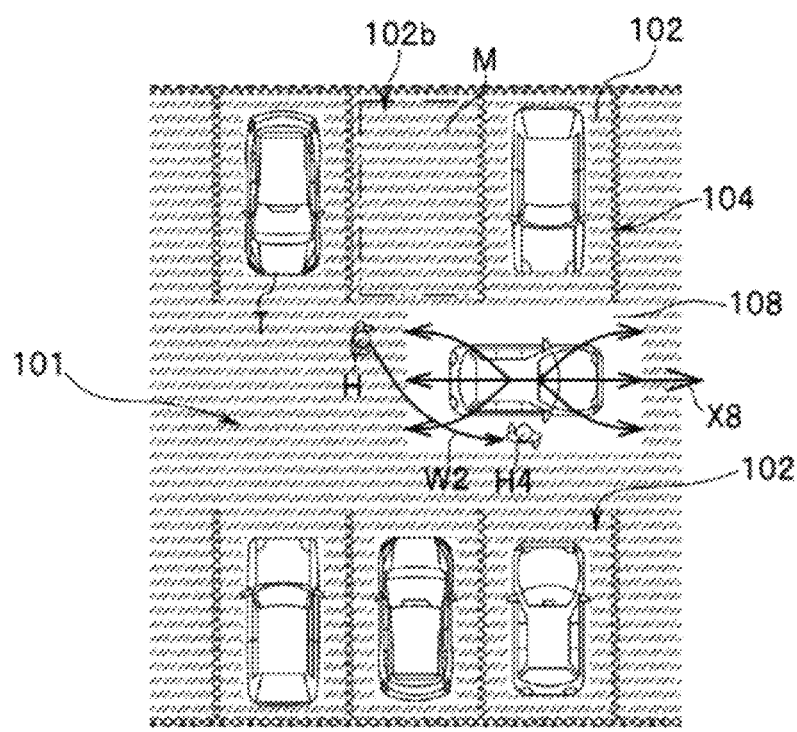
FIG. 17 is a conceptual diagram corresponding to a situation when processes of steps S83 and S84 in FIG. 11 are performed.

Thereafter, in step S84, the traveling ECU 14 may determine the boarding of the occupant such as the driver of the own vehicle M, and thereafter perform a traveling control of starting the own vehicle M from the stopping position [D] (see an arrow X8 in FIG. 17). The boarding of the occupant may be determined in a manner similar to that in the processes of steps S55, S63, and S73 described above. Thereafter, the processing sequence may be ended.

FIG. 17 is a conceptual diagram corresponding to a situation when the processes of steps S83 and S84 in FIG. 11 are performed. In the surrounding region of the own vehicle M stopped at the predetermined stopping position [D] on the internal passage 101, the boarding region 108 may be generated by the boarding region generation process of step S83 in FIG. 11. Upon generation of the boarding region 108, the occupant such as the driver of the own vehicle M may board the own vehicle M. The example illustrated in FIG. 17 indicates that the occupant such as the driver at the position denoted by the reference sign H during execution of the boarding region generation process has moved, along the arrow W2, to the position denoted by a reference sign H4. At this time, the occupant such as the driver H4 may board the own vehicle M. Thereafter, the traveling ECU 14 may determine the boarding, and thereafter execute the traveling control of starting the own vehicle M (see the arrow X8 in FIG. 17).

In contrast, in the process of step S81 described above, if the own vehicle M after being retrieved from the parking space 102b is unable to wait for the predetermined time period in the stopped state on the internal passage 101, the flow may proceed to step S71. Also if the own vehicle M is not configured to perform an automated retrieval operation, the flow may proceed to step S71. The processes of step S71 to S73 in this case may be as described above.

As described above, according to the example embodiment described above, when the occupant alights from the own vehicle after the own vehicle is parked within a predetermined parking space, or when the occupant boards the own vehicle before the own vehicle parked within a predetermined parking space is retrieved, for example, in a place such as a parking lot under a snow accumulation situation, the vehicle traveling control apparatus performs an appropriate traveling control of the vehicle in accordance with the surrounding situation and the surrounding road surface situation of the own vehicle.

In this case, the vehicle traveling control apparatus according to some embodiments may perform a traveling control of generating a boarding or alighting region in a road surface situation that allows the occupant to easily board or alight and pass through the region, by stamping down accumulated snow in the surrounding region of the own vehicle for improvement, with the wheels of the own vehicle.

By performing such a traveling control, the vehicle traveling control apparatus according to some embodiments makes it possible for the occupant to easily board or alight from the own vehicle and to easily pass through the surrounding region of the own vehicle, in the place such as the parking lot under the snow accumulation situation.

Note that a situation to which the processing sequence (FIGS. 2 and 11) executed by the vehicle traveling control apparatus 1 according to any embodiment of the disclosure is to be applied is not limited to a place such as a large parking lot having a large area described above. For example, the processing sequence may be applied substantially similarly to a parking lot attached to a private house, such as a garage, where at least one own vehicle may be parked.

In the example embodiment described above, the alighting region generation process of generating the alighting region and the boarding region generation process of generating the boarding region are described separately. In some embodiments, the alighting region and the boarding region may indicate substantially similar regions. In some embodiments, the alighting region generation process and the boarding region generation process may be substantially similar operations.

Accordingly, the alighting region and the boarding region may be referred to as a boarding or alighting region. The alighting region generation process and the boarding region generation process may be referred to as a boarding or alighting region generation process.

The disclosure is not limited to the foregoing example embodiments, and various modifications may be made without departing from the gist of the disclosure. Further, the foregoing example embodiments each include various stages of the disclosure, and various technologies may be extracted by appropriately combining the features of the disclosure described herein. For example, in a case where the above-described concerns may be addressed and the above-described effects may be obtained even if some features are deleted from all the features disclosed herein, the remaining features may be extracted as a technology. Furthermore, various components in the foregoing example embodiments may be combined as appropriate. The disclosure is limited by the appended claims but is not restricted by any particular example embodiment.

According to at least one embodiment of the disclosure, it is possible for an occupant to easily board or alight from a parked or stopped vehicle, for example, in a place such as a parking lot under a snow accumulation situation.

The traveling ECU 14 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the traveling ECU 14 illustrated in FIG. 1.

The invention claimed is:

1. A vehicle traveling control apparatus to be applied to a vehicle, the vehicle traveling control apparatus comprising:
a surrounding environment recognition device configured to acquire surrounding environment data regarding the vehicle;
a vehicle state recognition device configured to acquire state data regarding the vehicle; and
a traveling control unit configured to execute a traveling control of the vehicle, based on the surrounding environment data acquired by the surrounding environment recognition device and the state data acquired by the vehicle state recognition device, wherein
the traveling control unit is configured to, when the traveling control unit recognizes, based on the surrounding environment data, that the vehicle is parked or temporarily stopped in a parking lot and that snow has accumulated on a road surface around the vehicle, execute a region generation traveling control that comprises stamping down accumulated snow on the road surface with a wheel of the vehicle by causing the vehicle to move forward and backward only within a predetermined region corresponding to a region where an occupant enters or exits the vehicle, while performing a predetermined steering control, the region generation traveling control being configured to generate the region for the occupant to enter or exit the vehicle.

2. The vehicle traveling control apparatus according to claim 1, wherein the predetermined range for the forward and backward traveling is set based on at least one of a width of the vehicle and a position of an adjacent parked vehicle.

3. The vehicle traveling control apparatus according to claim 1, wherein the traveling control unit is configured to determine, based on the surrounding environment data, whether a road surface of a path through which the occupant passes to or from the parking or stopping position is covered with accumulated snow.

4. A vehicle traveling control apparatus to be applied to a vehicle, the vehicle traveling control apparatus comprising circuitry configured to
acquire surrounding environment data regarding the vehicle;
acquire state data regarding the vehicle; and
execute a traveling control of the vehicle, based on the surrounding environment data and the state data, wherein,
the circuitry is configured to, when it is recognized, based on the surrounding environment data, that the vehicle is parked or temporarily stopped in a parking lot and that snow has accumulated on a road surface around the vehicle, execute a region generation traveling control that comprises stamping down accumulated snow on the road surface with a wheel of the vehicle by causing the vehicle to move forward and backward only within a predetermined region corresponding to a region where an occupant enters or exits the vehicle, while performing a predetermined steering control, the region generation traveling control being configured to generate the region for the occupant to enter or exit the vehicle.

5. The vehicle traveling control apparatus according to claim 4, wherein the predetermined range for the forward and backward traveling is set based on at least one of a width of the vehicle and a position of an adjacent parked vehicle.

6. The vehicle traveling control apparatus according to claim 4, wherein the circuitry is configured to determine, based on the surrounding environment data, whether a road surface of a path through which the occupant passes to or from the parking or stopping position is covered with accumulated snow.

* * * * *